United States Patent
Liu et al.

(10) Patent No.: US 11,751,173 B2
(45) Date of Patent: Sep. 5, 2023

(54) METHOD AND DEVICE USED IN NODE FOR WIRELESS COMMUNICATION

(71) Applicants: Jin Liu, Shanghai (CN); Xiaobo Zhang, Shanghai (CN)

(72) Inventors: Jin Liu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 17/878,070

(22) Filed: Aug. 1, 2022

(65) Prior Publication Data
US 2022/0377710 A1     Nov. 24, 2022

Related U.S. Application Data

(63) Continuation of application No. 17/006,893, filed on Aug. 31, 2020, now Pat. No. 11,452,074.

(30) Foreign Application Priority Data

Sep. 6, 2019   (CN) .......................... 201910842938.0

(51) Int. Cl.
    *H04W 72/04*      (2023.01)
    *H04W 4/40*      (2018.01)
    *H04L 5/00*      (2006.01)
    *H04W 72/0446*      (2023.01)

(52) U.S. Cl.
CPC ........... *H04W 72/04* (2013.01); *H04L 5/0007* (2013.01); *H04W 4/40* (2018.02); *H04W 72/0446* (2013.01)

(58) Field of Classification Search
CPC ... H04W 72/04; H04W 72/0446; H04W 4/40; H04L 5/0007
See application file for complete search history.

(56) References Cited

U.S. PATENT DOCUMENTS

| | | | | | |
|---|---|---|---|---|---|
| 6,009,122 | A | * | 12/1999 | Chow | .................... H04L 5/0044 370/464 |
| 7,852,966 | B2 | * | 12/2010 | Matsumoto | ........... H04L 5/0046 455/442 |
| 10,182,449 | B2 | * | 1/2019 | Lopez | .................... H04L 5/0037 |
| 10,700,839 | B2 | * | 6/2020 | Zhang | ................. H04W 72/542 |
| 11,452,074 | B2 | * | 9/2022 | Liu | ........................ H04L 5/0044 |
| 2020/0213863 | A1 | * | 7/2020 | Wu | ........................ H04L 1/1812 |
| 2021/0076357 | A1 | * | 3/2021 | Liu | ........................ H04L 5/0094 |

\* cited by examiner

*Primary Examiner* — Raj Jain

(57) ABSTRACT

The disclosure provides method and device used in node for wireless communications. A first node receives first information, the first information indicating a first symbol set; transmits a first signaling in a first symbol group; and transmits a first radio signal in a second symbol group; the first symbol group belongs to the first symbol set; the first signaling indicates the second symbol group; at least one multicarrier symbol in the second symbol group belongs to the first symbol set, and at least one multicarrier symbol in the second symbol group does not belong to the first symbol set; a first bit sequence is used to generate the first radio signal, and the first bit sequence comprises a first bit sub-sequence and a second bit sub-sequence. The present disclosure offers an effective solution to dealing with the impact of a dynamic slot format on sidelink transmission in NR system.

20 Claims, 14 Drawing Sheets

METHOD AND DEVICE USED IN NODE FOR WIRELESS COMMUNICATION

CROSS REFERENCE TO RELATED APPLICATIONS

This application is the continuation of the U.S. patent application Ser. No. 17/006,893, filed on Aug. 31, 2020, which claims the priority benefit of Chinese Patent Application No. 201910842938.0, filed on Sep. 6, 2019. The full disclosure of which is incorporated herein by reference.

BACKGROUND

Technical Field

The present disclosure relates to transmission methods and devices in wireless communication systems, and in particular to a sidelink-related transmission scheme and device in wireless communications.

Related Art

Application scenarios of future wireless communication systems are becoming increasingly diversified, and different application scenarios have different performance demands on systems. In order to meet different performance requirements of various application scenarios, it was decided at the 3rd Generation Partner Project (3GPP) Radio Access Network (RAN) #72 plenary meeting that a study on New Radio (NR), or what is called Fifth Generation (5G), shall be conducted. The work item (WI) of NR was approved at the 3GPP RAN #75 plenary meeting to standardize NR.

In response to rapidly growing Vehicle-to-Everything (V2X) traffic, 3GPP has started standards setting and research work under the framework of NR. Currently, 3GPP has completed planning work targeting 5G V2X requirements and has included these requirements into standard TS22.886, where 3GPP identifies and defines 4 major Use Case Groups, covering cases of Vehicles Platooning, supporting Extended Sensors, Advanced Driving and Remote Driving. At 3GPP RAN #80 Plenary meeting, the technical Study Item (SI) of NR V2X was initiated. Later at the first AdHoc conference of RAN1 2019, it was agreed that the pathloss between a transmitter and a receiver in a V2X pair will be taken as reference when calculating the V2X transmitting power.

SUMMARY

Sidelink (SL) transmission resources in V2X refer to Uplink (UL) resources occupying the system. In 3GPP NR system, with an introduction of dynamic uplink and downlink configurations and flexible symbols, resources used for SL transmission are getting more fragmentary. Moreover, the resource pool configuration in V2X is either static or semi-static, leading to a result that resources in V2X resource pool may not be available for SL transmission whenever necessary.

In view of the above problem, the present disclosure provides a solution for SL resource allocation, which effectively addresses the impact brought about by dynamic slot format configurations on SL transmissions in NR system. It should be noted that the embodiments of a User Equipment (UE) in the present disclosure and characteristics in the embodiments may be applied to a base station if there is no conflict, and vice versa. And the embodiments of the present disclosure and the characteristics in the embodiments may be mutually combined if no conflict is incurred. Further, though originally targeted at single-carrier communications, the present disclosure is also applicable to multi-carrier communications; the present disclosure, though originally targeted at single-antenna communications, can also be applied to multi-antenna communications.

In one embodiment, the interpretations of the Terminology in the present disclosure are definitions referring to the 3GPP TS36 Specification series.

In one embodiment, the interpretations of the Terminology in the present disclosure are definitions referring to the 3GPP TS38 Specification series.

In one embodiment, the interpretations of the Terminology in the present disclosure are definitions referring to the 3GPP TS37 Specification series.

In one embodiment, the interpretations of the Terminology in the present disclosure are definitions referring to Conformance Specification of the Institute of Electrical and Electronics Engineers (IEEE).

The present disclosure provides a method in a first node for wireless communications, comprising:
receiving first information, the first information indicating a first symbol set;
transmitting a first signaling in a first symbol group; and
transmitting a first radio signal in a second symbol group;
herein, the first symbol group belongs to the first symbol set; the first signaling indicates the second symbol group, the second symbol group comprising a positive integer number of multicarrier symbols; at least one multicarrier symbol of the positive integer number of multicarrier symbols comprised by the second symbol group belongs to the first symbol set, and at least one multicarrier symbol of the positive integer number of multicarrier symbols comprised by the second symbol group does not belong to the first symbol set; a first bit sequence is used for generating the first radio signal, and the first bit sequence comprises a first bit sub-sequence and a second bit sub-sequence, and an order of the first bit sub-sequence in the first bit sequence is prior to that of the second bit sub-sequence in the first bit sequence; the first bit sub-sequence is mapped onto multicarrier symbol(s) in the second symbol group belonging to the first symbol set, while the second bit sub-sequence is mapped onto multicarrier symbol(s) in the second symbol group not belonging to the first symbol set.

In one embodiment, the present disclosure aims to address an issue that for static or semi-static V2X resource pool configuration, V2X resources are not available at any time due to dynamic configurations of slot formats.

In one embodiment, the method in the present disclosure is to create association between a first symbol set and a second symbol group.

In one embodiment, the method in the present disclosure is to create association between a first symbol set and multicarrier symbol(s) belonging to the first symbol set.

In one embodiment, the method in the present disclosure is to create association between a first bit sub-sequence and multicarrier symbol(s) belonging to the first symbol set.

In one embodiment, the method in the present disclosure is to create association between a second bit sub-sequence and multicarrier symbol(s) not belonging to the first symbol set.

In one embodiment, the above method is characterized in that multicarrier symbol(s) in the first symbol set is(are) available resources that are relatively stable, used for transmitting data or control signaling of higher priority and HARQ feedback to guarantee a primary SL transmission function.

In one embodiment, the above method is characterized in that multicarrier symbol(s) in the second symbol group not belonging to the first symbol set is(are) dynamic resources, whose size, position and availability can be very dynamic. The dynamic resources are used for transmitting data of lower priority, which, even though not received by the second node, will have little effect on fundamental transmissions on SL and meanwhile bring extra gains.

In one embodiment, the above method is advantageous in effectively solving the impact of dynamic slot format configurations on SL transmissions in the NR system.

According to one aspect of the present disclosure, the above method is characterized in comprising:

receiving a second signaling, the second signaling indicating a second symbol set;

herein, the second symbol set comprises the first symbol set, and the second symbol group belongs to the second symbol set.

According to one aspect of the present disclosure, the above method is characterized in comprising:

detecting first target information in a third symbol group, the first target information indicating whether the first radio signal is correctly decoded;

herein, the first symbol group is used for indicating the third symbol group; and the third symbol group is unrelated to a number of and respective position(s) of multicarrier symbol(s) comprised by a second symbol sub-group; the second symbol sub-group comprises each multicarrier symbol in the second symbol group that does not belong to the first symbol set.

According to one aspect of the present disclosure, the above method is characterized in comprising:

detecting first target information in a third symbol group, the first target information indicating whether the first radio signal is correctly decoded;

herein, a first symbol sub-group is used for indicating the third symbol group; the third symbol group is unrelated to a number of and respective position(s) of multicarrier symbol(s) comprised by a second symbol sub-group; the first symbol sub-group comprises each multicarrier symbol in the second symbol group that belongs to the first symbol set; the second symbol sub-group comprises each multicarrier symbol in the second symbol group that does not belong to the first symbol set.

According to one aspect of the present disclosure, the above method is characterized in that the first bit sub-sequence is sequentially mapped into multicarrier symbols comprised by the first symbol sub-group in chronological order; while the second bit sub-sequence is reversely mapped into multicarrier symbols comprised by the second symbol sub-group in chronological order.

According to one aspect of the present disclosure, the above method is characterized in that the first node is a UE.

According to one aspect of the present disclosure, the above method is characterized in that the first node is a base station.

According to one aspect of the present disclosure, the above method is characterized in that the first node is a relay node.

The present disclosure provides a method in a second node for wireless communications, comprising:

transmitting first information, the first information indicating a first symbol set;

monitoring a first signaling in a first symbol group; and receiving a first radio signal in a second symbol group when the first signaling is detected;

herein, the first symbol group belongs to the first symbol set; the first signaling indicates the second symbol group, the second symbol group comprising a positive integer number of multicarrier symbols; at least one multicarrier symbol of the positive integer number of multicarrier symbols comprised by the second symbol group belongs to the first symbol set, and at least one multicarrier symbol of the positive integer number of multicarrier symbols comprised by the second symbol group does not belong to the first symbol set; a first bit sequence is used for generating the first radio signal, and the first bit sequence comprises a first bit sub-sequence and a second bit sub-sequence, and an order of the first bit sub-sequence in the first bit sequence is prior to that of the second bit sub-sequence in the first bit sequence; the first bit sub-sequence is mapped onto multicarrier symbol(s) in the second symbol group belonging to the first symbol set, while the second bit sub-sequence is mapped onto multicarrier symbol(s) in the second symbol group not belonging to the first symbol set.

According to one aspect of the present disclosure, the above method is characterized in comprising:

transmitting a second signaling, the second signaling indicating a second symbol set;

herein, the second symbol set comprises the first symbol set, and the second symbol group belongs to the second symbol set.

According to one aspect of the present disclosure, the above method is characterized in comprising:

transmitting first target information in a third symbol group, the first target information indicating whether the first radio signal is correctly decoded;

herein, the first symbol group is used for indicating the third symbol group, and the third symbol group is unrelated to a number of and respective position(s) of multicarrier symbol(s) comprised by a second symbol sub-group; the second symbol sub-group comprises each multicarrier symbol in the second symbol group that does not belong to the first symbol set.

According to one aspect of the present disclosure, the above method is characterized in comprising:

transmitting first target information in a third symbol group, the first target information indicating whether the first radio signal is correctly decoded;

herein, a first symbol sub-group is used for indicating the third symbol group; the third symbol group is unrelated to a number of and respective position(s) of multicarrier symbol(s) comprised by a second symbol sub-group; the first symbol sub-group comprises each multicarrier symbol in the second symbol group that belongs to the first symbol set; the second symbol sub-group comprises each multicarrier symbol in the second symbol group that does not belong to the first symbol set.

According to one aspect of the present disclosure, the above method is characterized in that the first bit sub-sequence is sequentially mapped into multicarrier symbols comprised by the first symbol sub-group in chronological order; while the second bit sub-sequence is reversely mapped into multicarrier symbols comprised by the second symbol sub-group in chronological order.

According to one aspect of the present disclosure, the above method is characterized in that the second node is a UE.

According to one aspect of the present disclosure, the above method is characterized in that the second node is a base station.

According to one aspect of the present disclosure, the above method is characterized in that the second node is a relay node.

The present disclosure provides a first node for wireless communications, comprising:

a first receiver, which receives first information, the first information indicating a first symbol set; and a first transmitter, which transmits a first signaling in a first symbol group;

the first transmitter, which also transmits a first radio signal in a second symbol group;

herein, the first symbol group belongs to the first symbol set; the first signaling indicates the second symbol group, the second symbol group comprising a positive integer number of multicarrier symbols; at least one multicarrier symbol of the positive integer number of multicarrier symbols comprised by the second symbol group belongs to the first symbol set, and at least one multicarrier symbol of the positive integer number of multicarrier symbols comprised by the second symbol group does not belong to the first symbol set; a first bit sequence is used for generating the first radio signal, and the first bit sequence comprises a first bit sub-sequence and a second bit sub-sequence, and an order of the first bit sub-sequence in the first bit sequence is prior to that of the second bit sub-sequence in the first bit sequence; the first bit sub-sequence is mapped onto multicarrier symbol(s) in the second symbol group belonging to the first symbol set, while the second bit sub-sequence is mapped onto multicarrier symbol(s) in the second symbol group not belonging to the first symbol set.

The present disclosure provides a second node for wireless communications, comprising:

a second transmitter, which transmits first information, the first information indicating a first symbol set; and a second receiver, which monitors a first signaling in a first symbol group;

the second receiver, which receives a first radio signal in a second symbol group when the first signaling is detected;

herein, the first symbol group belongs to the first symbol set; the first signaling indicates the second symbol group, the second symbol group comprising a positive integer number of multicarrier symbols; at least one multicarrier symbol of the positive integer number of multicarrier symbols comprised by the second symbol group belongs to the first symbol set, and at least one multicarrier symbol of the positive integer number of multicarrier symbols comprised by the second symbol group does not belong to the first symbol set; a first bit sequence is used for generating the first radio signal, and the first bit sequence comprises a first bit sub-sequence and a second bit sub-sequence, and an order of the first bit sub-sequence in the first bit sequence is prior to that of the second bit sub-sequence in the first bit sequence; the first bit sub-sequence is mapped onto multicarrier symbol(s) in the second symbol group belonging to the first symbol set, while the second bit sub-sequence is mapped onto multicarrier symbol(s) in the second symbol group not belonging to the first symbol set.

In one embodiment, the present disclosure is advantageous in the following aspects:

The present disclosure associates a first symbol set with a second symbol group.

The present disclosure associates a first symbol set with multicarrier symbol(s) belonging to the first symbol set.

The present disclosure associates a first bit sub-sequence with multicarrier symbol(s) belonging to the first symbol set.

The present disclosure associates a second bit sub-sequence with multicarrier symbol(s) not belonging to the first symbol set.

Multicarrier symbol(s) in the first symbol set of the present disclosure is(are) available resources that are relatively stable, which are used for transmitting data or control signaling of higher priority and HARQ feedback, thus guaranteeing a basic function of SL transmission.

Multicarrier symbol(s) in the second symbol group not belonging to the first symbol set in the present disclosure is(are) dynamic resources, whose size, position and availability can be changing all the time. The dynamic resources are used for transmitting data of lower priority, which may cause little influence on general SL transmissions even if not received by a second node, instead, extra gains will be generated therefrom.

The present disclosure solves the impact of dynamic slot format configurations on SL transmissions in the NR system.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
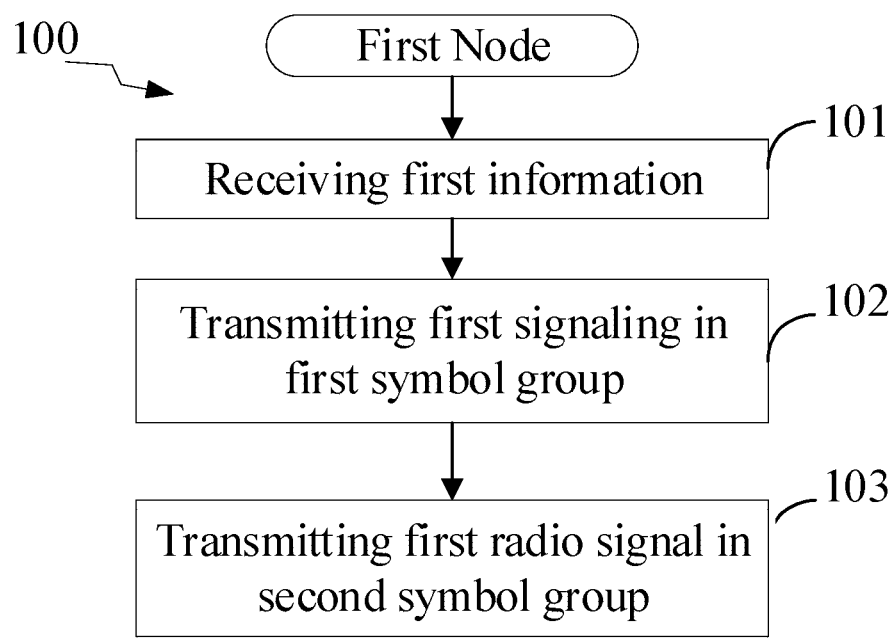
FIG. 1 illustrates a flowchart of processing of a first node according to one embodiment of the present disclosure.

Embodiment 1 illustrates a flowchart of processing of a first node according to one embodiment of the present disclosure, as shown in FIG. 1. In FIG. 1, each box represents a step. In Embodiment 1, a first node in the present disclosure first performs step 101 to receive first information; and then performs step 102 to transmit a first signaling in a first symbol group; and finally performs step 103 to transmit a first radio signal in a second symbol group; the first symbol group belongs to the first symbol set; the first signaling indicates the second symbol group, the second symbol group comprising a positive integer number of multicarrier symbols; at least one multicarrier symbol of the positive integer number of multicarrier symbols comprised by the second symbol group belongs to the first symbol set, and at least one multicarrier symbol of the positive integer number of multicarrier symbols comprised by the second symbol group does not belong to the first symbol set; a first bit sequence is used for generating the first radio signal, and the first bit sequence comprises a first bit sub-sequence and a second bit sub-sequence, and an order of the first bit sub-sequence in the first bit sequence is prior to that of the second bit sub-sequence in the first bit sequence; the first bit sub-sequence is mapped onto multicarrier symbol(s) in the second symbol group belonging to the first symbol set, while the second bit sub-sequence is mapped onto multicarrier symbol(s) in the second symbol group not belonging to the first symbol set.

In one embodiment, the first symbol set comprises a positive integer number of multicarrier symbol(s).

In one embodiment, the first symbol set comprises Q first-type symbol groups, and any of the Q first-type symbol groups comprises a positive integer number of multicarrier symbol(s), Q being a positive integer.

In one embodiment, among the Q first-type symbol groups comprised by the first symbol set at least two first-type symbol groups comprise equal numbers of multicarrier symbols.

In one embodiment, among the Q first-type symbol groups comprised by the first symbol set at least two first-type symbol groups comprise unequal numbers of multicarrier symbols.

In one embodiment, the positive integer number of multicarrier symbol(s) comprised by the first symbol set is(are) reserved for UL transmissions.

In one embodiment, the positive integer number of multicarrier symbol(s) comprised by the first symbol set is(are) reserved for UL transmissions within a given frequency band.

In one embodiment, the positive integer number of multicarrier symbol(s) comprised by the first symbol set is(are) reserved for UL transmissions within (a) given positive integer number of subcarrier(s) in frequency domain.

In one embodiment, each of the positive integer number of multicarrier symbol(s) comprised by the first symbol set is an uplink (UL) symbol.

In one embodiment, for the definition of the UL symbol, refer to 3GPP TS38.213, section 11.1.

In one embodiment, each of the positive integer number of multicarrier symbol(s) comprised by the first symbol set is a Flexible Symbol.

In one embodiment, for the definition of the Flexible Symbol, refer to 3GPP TS38.213, section 11.1.

In one embodiment, the positive integer number of multicarrier symbols comprised by the first symbol set comprise (an) uplink symbol(s) and (a) Flexible Symbol(s).

In one embodiment, each of the positive integer number of multicarrier symbol(s) comprised by the first symbol set is either a UL symbol or a Flexible Symbol.

In one embodiment, for the definition of the Flexible Symbol, refer to 3GPP TS38.213, section 11.1.

In one embodiment, the positive integer number of multicarrier symbol(s) comprised by the first symbol set is(are) reserved for Sidelink (SL) transmissions.

In one embodiment, the positive integer number of multicarrier symbol(s) comprised by the first symbol set is(are) reserved for SL transmissions within a given frequency band.

In one embodiment, the positive integer number of multicarrier symbol(s) comprised by the first symbol set is(are) reserved for SL transmissions within (a) given positive integer number of subcarrier(s) in frequency domain.

In one embodiment, the positive integer number of multicarrier symbol(s) comprised by the first symbol set is(are) used for SL.

In one embodiment, the positive integer number of multicarrier symbol(s) comprised by the first symbol set is(are) used for SL communications.

In one embodiment, the positive integer number of multicarrier symbol(s) comprised by the first symbol set is(are) used for SL transmissions.

In one embodiment, the positive integer number of multicarrier symbol(s) comprised by the first symbol set is(are) used for transmitting in SL.

In one embodiment, the positive integer number of multicarrier symbol(s) comprised by the first symbol set is(are) used for receiving in SL.

In one embodiment, the positive integer number of multicarrier symbol(s) comprised by the first symbol set is(are) only used for SL within a given frequency band.

In one embodiment, the positive integer number of multicarrier symbol(s) comprised by the first symbol set is(are) only used for SL within (a) given positive integer number of subcarrier(s) in frequency domain.

In one embodiment, the positive integer number of multicarrier symbol(s) comprised by the first symbol set is(are) used for SL and UL.

In one embodiment, the positive integer number of multicarrier symbol(s) comprised by the first symbol set is(are) used for SL and UL within a given frequency band.

In one embodiment, the positive integer number of multicarrier symbol(s) comprised by the first symbol set is(are) used for SL and UL within (a) given positive integer number of subcarrier(s) in frequency domain.

In one embodiment, the first symbol set comprises a Physical Sidelink Broadcast Channel (PSBCH).

In one embodiment, the first symbol set comprises a Physical Sidelink Control Channel (PSCCH).

In one embodiment, the first symbol set comprises a Physical Sidelink Feedback Channel (PSFCH).

In one embodiment, the first symbol set comprises a Physical Sidelink Shared Channel (PSSCH).

In one embodiment, the first symbol set comprises a PSCCH and a PSFCH.

In one embodiment, the first symbol set comprises a PSCCH and a PSSCH.

In one embodiment, the first symbol set comprises a PSCCH, a PSSCH and a PSFCH.

In one embodiment, the first symbol set comprises a PSBCH, a PSCCH, a PSSCH and a PSFCH.

In one embodiment, the first symbol set comprises a Physical Uplink Control Channel (PUCCH).

In one embodiment, the first symbol set comprises a Physical Uplink Shared Channel (PUSCH).

In one embodiment, the first symbol set comprises a PUCCH and a PUSCH.

In one embodiment, the first symbol set comprises a Physical Random Access Channel (PRACH).

In one embodiment, the first symbol set comprises a PUCCH, a PUSCH and a PRACH.

In one embodiment, at least one multicarrier symbol of the positive integer number of multicarrier symbol(s) comprised by the first symbol set is used for transmitting a Sidelink Synchronization Signal (SLSS).

In one embodiment, at least one multicarrier symbol of the positive integer number of multicarrier symbol(s) comprised by the first symbol set is used for transmitting a Primary Sidelink Synchronization Signal (PSSS).

In one embodiment, at least one multicarrier symbol of the positive integer number of multicarrier symbol(s) comprised by the first symbol set is used for transmitting a Secondary Sidelink Synchronization Signal (SSSS).

In one embodiment, at least one multicarrier symbol of the positive integer number of multicarrier symbol(s) comprised by the first symbol set is used for transmitting a Sidelink Reference Signal (SL-RS).

In one embodiment, at least one multicarrier symbol of the positive integer number of multicarrier symbol(s) comprised by the first symbol set is used for transmitting a Sidelink Channel State Information-Reference Signal (SL CSI-RS).

In one embodiment, at least one multicarrier symbol of the positive integer number of multicarrier symbol(s) comprised by the first symbol set is used for transmitting (a) signal(s) on a Sidelink Broadcast Channel (SL-BCH).

In one embodiment, at least one multicarrier symbol of the positive integer number of multicarrier symbol(s) comprised by the first symbol set is used for transmitting Sidelink Control Information (SCI).

In one embodiment, at least one multicarrier symbol of the positive integer number of multicarrier symbol(s) comprised by the first symbol set is used for transmitting (a) signal(s) on a Sidelink Shared Channel (SL-SCH).

In one embodiment, at least one multicarrier symbol of the positive integer number of multicarrier symbol(s) comprised by the first symbol set is used for transmitting SL data.

In one embodiment, the first information is Broadcast.

In one embodiment, the first information is Groupcast.

In one embodiment, the first information is Unicast.

In one embodiment, the first information is Cell-specific.

In one embodiment, the first information is UE-specific.

In one embodiment, the first information is transmitted through a Sidelink Shared Channel (SL-SCH).

In one embodiment, the first information is transmitted through a PSCCH.

In one embodiment, the first information is transmitted through a PSSCH.

In one embodiment, the first information is transmitted through a PSCCH and a PSSCH.

In one embodiment, the first information is transmitted through a Downlink Shared Channel (DL-SCH).

In one embodiment, the first information is transmitted through a Physical Downlink Control Channel (PDCCH).

In one embodiment, the first information is transmitted through a Physical Downlink Shared Channel (PDSCH).

In one embodiment, the first information is transmitted through a PDCCH and a PDSCH.

In one embodiment, the first information comprises all or part of a Higher Layer Signaling.

In one embodiment, the first information comprises all or part of a Radio Resource Control (RRC) layer signaling.

In one embodiment, the first information comprises one or more fields in an RRC Information Element (IE).

In one embodiment, for the definition of the RRC IE, refer to 3GPP TS38.331, section 6.3.

In one embodiment, the first information comprises one or more fields in a System Information Block (SIB).

In one embodiment, the first information comprises all or part of a Multimedia Access Control (MAC) layer signaling.

In one embodiment, the first information comprises one or more fields in a MAC Control Element (CE).

In one embodiment, the first information comprises one or more fields in a Physical (PHY) Layer signaling.

In one embodiment, the first information comprises one or more fields in a piece of Sidelink Control Information (SCI).

In one embodiment, for the definition of the SCI, refer to 3GPP TS36.212, section 5.4.3.

In one embodiment, the first information comprises one or more fields in a piece of Downlink Control Information (DCI).

In one embodiment, for the definition of the DCI, refer to 3GPP TS36.212, section 5.3.3.

In one embodiment, the first information is semi-statically configured.

In one embodiment, the first information is dynamically configured.

In one embodiment, the first information is used for indicating resources of SL.

In one embodiment, the first information is used for indicating the first symbol set.

In one embodiment, the first information explicitly indicates the first symbol set.

In one embodiment, the first information implicitly indicates the first symbol set.

In one embodiment, the first information indicates the positive integer number of multicarrier symbol(s) comprised by the first symbol set.

In one embodiment, the first information indicates the Q first-type symbol groups comprised by the first symbol set.

In one embodiment, the first information indicates time-domain resource units occupied by the first symbol set.

In one embodiment, the first information indicates a time-domain resource unit occupied by any of the Q first-type symbol groups comprised by the first symbol set.

In one embodiment, the first information indicates a frequency-domain resource unit occupied by any of the Q first-type symbol groups comprised by the first symbol set.

In one embodiment, the first information comprises proportioning of uplink and downlink resources.

In one embodiment, the first information comprises TDD-UL-DL-Config.

In one embodiment, the TDD-UL-DL-Config is an RRC IE.

In one embodiment, the definition of the TDD-UL-DL-Config can be found in 3GPP TS38.331, section 6.3.2.

In one embodiment, the first information comprises a parameter TDD-UL-DL-ConfigurationCommon.

In one embodiment, the definition of the parameter TDD-UL-DL-ConfigurationCommon can be found in 3GPP TS38.331.

In one embodiment, the first information comprises a parameter TDD-UL-DL-ConfigDedicated.

In one embodiment, the definition of the parameter TDD-UL-DL-ConfigDedicated can be found in 3GPP TS38.331.

In one embodiment, the first information comprises a parameter TDD-UL-DL-Pattern.

In one embodiment, the definition of the parameter TDD-UL-DL-Pattern can be found in 3GPP TS38.331, section 6.3.2.

In one embodiment, the first information comprises a Slot Format.

In one embodiment, the first information comprises a Slot Format Indicator (SFI).

In one embodiment, the Slot Format is a field in a dynamic signaling.

In one embodiment, the definition of the Slot Format can be found in 3GPP TS38.213, section 11.1.1.

In one embodiment, the first signaling is used for scheduling the first radio signal.

In one embodiment, the first signaling is used for indicating the second symbol group.

In one embodiment, the first signaling is used for indicating a Modulation and Coding Scheme (MCS) employed by the first bit sequence.

In one embodiment, the first signaling is used for indicating a Demodulation Reference Signal (DMRS) employed by the first bit sequence.

In one embodiment, the first signaling is used for indicating a transmitting power employed by the first bit sequence.

In one embodiment, the first signaling is used for indicating a Redundancy Version (RV) employed by the first bit sequence.

In one embodiment, the first signaling comprises one or more fields in a piece of SCI.

In one embodiment, the first signaling is SCI.

In one embodiment, the first signaling comprises one or more fields in a Configured Grant.

In one embodiment, the first signaling is the Configured Grant.

In one embodiment, the definition of the Configured Grant can be found in 3GPP TS38.214, section 6.1.2.3.

In one embodiment, the first signaling comprises Priority.

In one embodiment, the first signaling is used for indicating the second symbol group.

In one embodiment, the first signaling explicitly indicates the second symbol group.

In one embodiment, the first signaling implicitly indicates the second symbol group.

In one embodiment, the first signaling indicates the positive integer number of multicarrier symbols comprised by the second symbol group.

In one embodiment, the first signaling indicates a quantity of the positive integer number of multicarrier symbols comprised by the second symbol group.

In one embodiment, the first signaling indicates time-domain resource units occupied by the second symbol group.

In one embodiment, the first signaling indicates a time-domain resource unit occupied by any of the positive integer number of multicarrier symbols comprised by the second symbol group.

In one embodiment, the first signaling indicates frequency-domain resource units occupied by the second symbol group.

In one embodiment, the first bit sequence comprises a positive integer number of sequentially arranged bits.

In one embodiment, the first bit sequence comprises a positive integer number of first-type bit sequence(s), and any of the positive integer number of first-type bit sequence(s) comprises a positive integer number of sequentially arranged bits.

In one embodiment, the first bit sequence comprises a positive integer number of Transport Block(s) (TB).

In one embodiment, the first bit sequence comprises a TB.

In one embodiment, the first bit sequence comprises a positive integer number of Code Block(s) (CB).

In one embodiment, the first bit sequence comprises a positive integer number of Code Block Group(s) (CBG).

In one embodiment, the first bit sequence comprises a positive integer number of Redundancy Version(s) (RV).

In one embodiment, any first-type bit sequence among the positive integer number of first-type bit sequence(s) comprised by the first bit sequence is a positive integer number of TB(s).

In one embodiment, any first-type bit sequence among the positive integer number of first-type bit sequence(s) comprised by the first bit sequence is a TB.

In one embodiment, any first-type bit sequence among the positive integer number of first-type bit sequence(s) comprised by the first bit sequence is a positive integer number of CB(s).

In one embodiment, any first-type bit sequence among the positive integer number of first-type bit sequence(s) comprised by the first bit sequence is a CB.

In one embodiment, any first-type bit sequence among the positive integer number of first-type bit sequence(s) comprised by the first bit sequence is a positive integer number of CBG(s).

In one embodiment, any first-type bit sequence among the positive integer number of first-type bit sequence(s) comprised by the first bit sequence is a CBG.

In one embodiment, any first-type bit sequence among the positive integer number of first-type bit sequence(s) comprised by the first bit sequence is a positive integer number of RV(s).

In one embodiment, any first-type bit sequence among the positive integer number of first-type bit sequence(s) comprised by the first bit sequence is an RV.

In one embodiment, the first radio signal is generated by the first bit sequence through TB-level Cyclic Redundancy Check (CRC) Attachment.

In one embodiment, the first radio signal is generated by the first bit sequence sequentially through TB-level CRC Attachment, Code Block Segmentation and CB-level CRC Attachment.

In one embodiment, the first radio signal is generated by all or part of bits in the first bit sequence sequentially through TB-level CRC Attachment, Code Block Segmentation and CB-level CRC Attachment, Channel Coding, Rate Matching, Code Block Concatenation, scrambling, Modulation, Layer Mapping, Antenna Port Mapping, Mapping to Physical Resource Blocks, and Baseband Signal Generation as well as Modulation and Upconversion.

In one embodiment, the first radio signal is generated by the first bit sequence sequentially through a Modulation Mapper, a Layer Mapper, Precoding, a Resource Element Mapper and Multicarrier Symbol Generation.

In one embodiment, the Channel Coding is based on a polar code.

In one embodiment, the Channel Coding is based on a Low-density Parity-Check (LDPC) code.

In one embodiment, the first radio signal is generated by the positive integer number of first-type bit sequence(s) (respectively) through TB-level CRC Attachment.

In one embodiment, the first radio signal is generated by the positive integer number of first-type bit sequence(s) respectively through TB-level CRC Attachment, Code Block Segmentation and CB-level CRC Attachment in sequence.

In one embodiment, the first radio signal is generated by the positive integer number of first-type bit sequence(s) respectively through TB-level CRC Attachment, Code Block Segmentation and CB-level CRC Attachment, Channel Coding, Rate Matching, Code Block Concatenation, scrambling, Modulation, Layer Mapping, Antenna Port Mapping, Mapping to Physical Resource Blocks, and Baseband Signal Generation as well as Modulation and Upconversion in sequence.

In one embodiment, the first radio signal is generated by the positive integer number of first-type bit sequence(s) respectively through a Modulation Mapper, a Layer Mapper, Precoding, a Resource Element Mapper and Multicarrier Symbol Generation in sequence.

In one embodiment, the first bit sequence comprises data transmitted on a Sidelink Shared Channel (SL-SCH).

In one embodiment, the first bit sequence comprises all or part of a higher layer signaling.

In one embodiment, the first bit sequence comprises all or part of an RRC layer signaling.

In one embodiment, the first bit sequence comprises one or more fields in an RRC IE.

In one embodiment, the first bit sequence comprises all or part of a MAC layer signaling.

In one embodiment, the first bit sequence comprises one or more fields in a MAC CE.

In one embodiment, the first bit sequence comprises one or more fields in a PHY layer signaling.

In one embodiment, the first bit sequence comprises one or more fields in a piece of SCI.

In one embodiment, the first bit sequence does not comprise SCI.

In one embodiment, the first radio signal is transmitted through a PSCCH.

In one embodiment, the first radio signal is transmitted through a PSSCH.

In one embodiment, the first radio signal is transmitted through a PSCCH and a PSSCH.

In one embodiment, the first radio signal is transmitted through a PUCCH.

In one embodiment, the first radio signal is transmitted through a PUSCH.

In one embodiment, the first radio signal is transmitted through a PUCCH and a PUSCH.

In one embodiment, the first radio signal is transmitted via broadcast.

In one embodiment, the first radio signal is transmitted via groupcast.

In one embodiment, the first radio signal is transmitted via unicast.

In one embodiment, the first radio signal is cell-specific.

In one embodiment, the first radio signal is UE-specific.

In one embodiment, the first radio signal comprises a Reference Signal (RS).

In one embodiment, the first radio signal does not comprise any RS.

In one embodiment, the first radio signal comprises a Demodulation Reference Signal (DMRS).

In one embodiment, the first radio signal does not comprise any DMRS.

In one embodiment, the first radio signal comprises a Channel State Information-Reference Signal (CSI-RS).

In one embodiment, the first radio signal does not comprise any CSI-RS.

In one embodiment, the first radio signal comprises a Sidelink DMRS (SL DMRS).

In one embodiment, the first radio signal does not comprise any SL DMRS.

In one embodiment, the first radio signal comprises a PSSCH DMRS, i.e., a DMRS for demodulating a PSSCH.

In one embodiment, the first radio signal does not comprise any PSSCH DMRS.

In one embodiment, the first radio signal comprises a PSCCH DMRS, i.e., a DMRS for demodulating a PSCCH.

In one embodiment, the first radio signal does not comprise any PSCCH DMRS.

In one embodiment, the first radio signal comprises a Sidelink CSI-RS (SL CSI-RS).

In one embodiment, the first radio signal does not comprise any SL CSI-RS.

Embodiment 2

Figure 2:
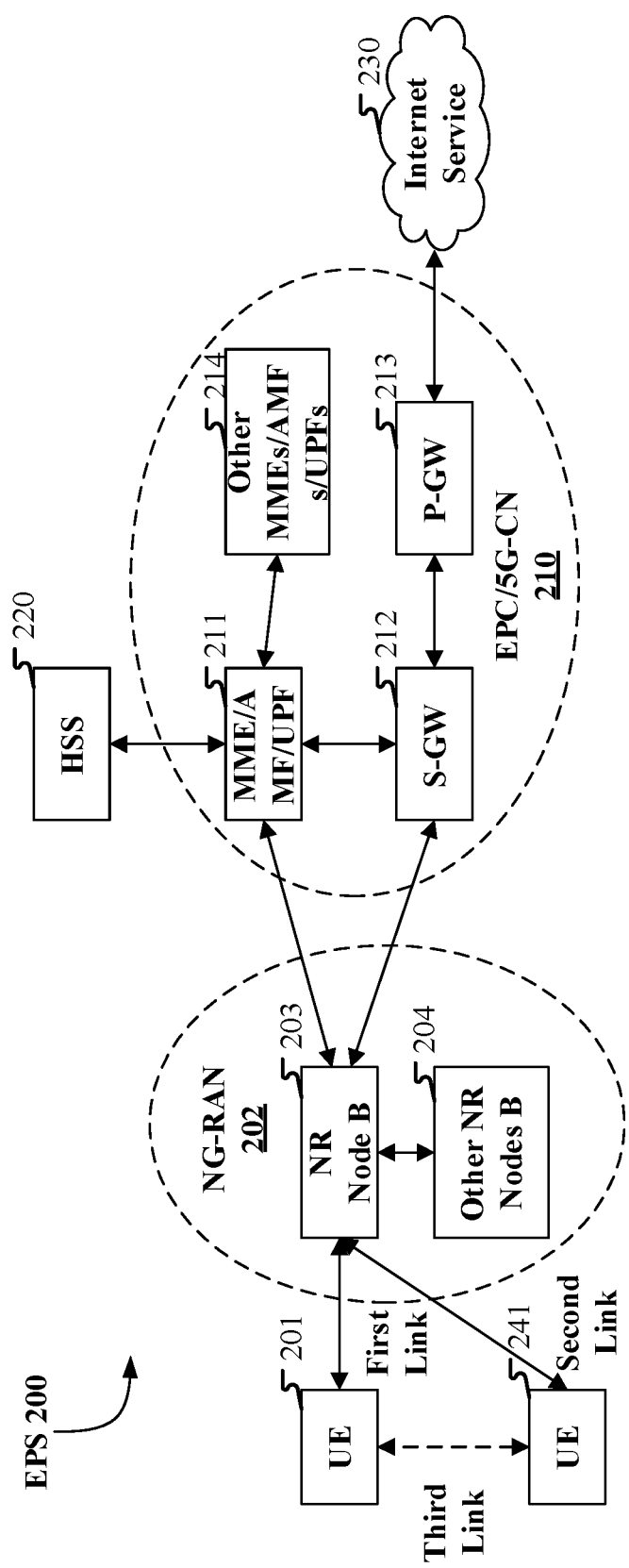
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of 5G NR, Long-Term Evolution (LTE), and Long-Term Evolution Advanced (LTE-A) systems. The 5G NR or LTE network architecture 200 may be called an Evolved Packet System (EPS) 200, or other applicable terms. The EPS 200 may comprise one or more UEs 201/UE 241, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises operator-compatible IP services, specifically including Internet, Intranet, IP Multimedia Subsystem (IMS) and Packet Switching Streaming (PSS) services.

In one embodiment, the first node in the present disclosure comprises the UE 201.

In one embodiment, the second node in the present disclosure comprises the UE 241.

In one embodiment, the third node in the present disclosure comprises the gNB 203.

In one embodiment, the UE in the present disclosure comprises the UE 201.

In one embodiment, the UE in the present disclosure comprises the UE 241.

In one embodiment, the base station in the present disclosure comprises the gNB 203.

In one embodiment, the relay equipment in the present disclosure comprises the gNB 203.

In one embodiment, the UE 201 supports sidelink transmissions.

In one embodiment, the UE 201 supports a PC5 interface.

In one embodiment, the UE 201 supports a Uu interface and a PC5 interface.

In one embodiment, the UE 241 supports sidelink transmissions.

In one embodiment, the UE 241 supports a PC5 interface.

In one embodiment, the UE 241 supports a Uu interface and a PC5 interface.

In one embodiment, the gNB 203 supports a Uu interface.

In one embodiment, a receiver of the second signaling in the present disclosure comprises the UE 201.

In one embodiment, a transmitter of the second signaling in the present disclosure comprises the gNB 203.

In one embodiment, a transmitter of the second signaling in the present disclosure comprises the UE 241.

In one embodiment, a receiver of the first information in the present disclosure comprises the UE 201.

In one embodiment, a transmitter of the first information in the present disclosure comprises the gNB 203.

In one embodiment, a transmitter of the first information in the present disclosure comprises the UE 241.

In one embodiment, a transmitter of the first signaling in the present disclosure comprises the UE 201.

In one embodiment, a receiver of the first signaling in the present disclosure comprises the UE 241.

In one embodiment, a transmitter of the first radio signal in the present disclosure comprises the UE 201.

In one embodiment, a receiver of the first radio signal in the present disclosure comprises the UE 241.

In one embodiment, a transmitter of the first target information in the present disclosure comprises the UE 241.

In one embodiment, a receiver of the first target information in the present disclosure comprises the UE 201.

Embodiment 3

Figure 3:
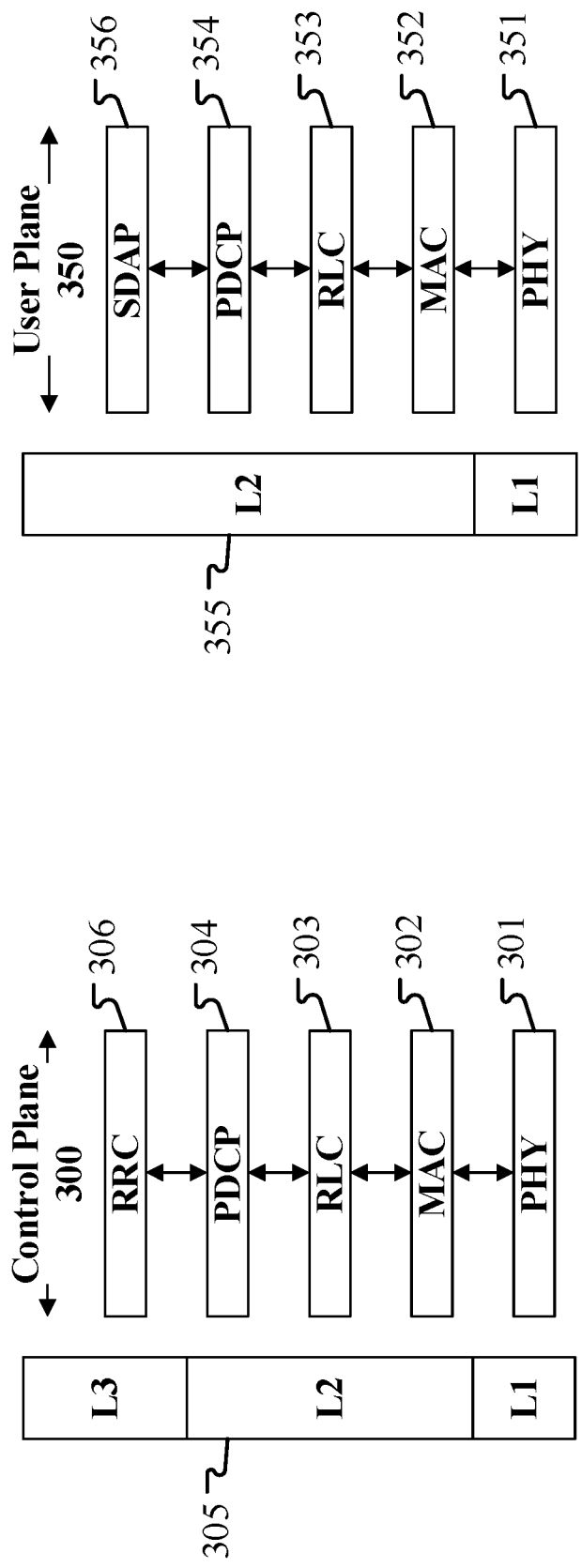
FIG. 3 illustrates a schematic diagram of a radio protocol architecture of a user plane and a control plane according to one embodiment of the present disclosure.

Embodiment 3 illustrates a schematic diagram of an embodiment of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB, or, RSU in V2X) and a second communication node (gNB, UE, or, RSU in V2X), or between two UEs is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between the first communication node and the second communication node, and between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication nodes of the network side. The PDCP sublayer 304 provides multiplexing among variable radio bearers and logical channels. The PDCP sublayer 304 provides security by encrypting a packet and provides support for first communication node handover between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a physical layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher layer packet to reduce radio transmission overhead. The L2 layer 355 in the user plane 350 also comprises a Service Data Adaptation Protocol (SDAP) sublayer 356, which is in charge of the mapping of QoS stream and Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the radio protocol architecture in FIG. 3 is applicable to the third node in the present disclosure.

In one embodiment, the second signaling in the present disclosure is generated by the RRC sublayer 306.

In one embodiment, the second signaling in the present disclosure is transmitted from the MAC sublayer 302 to the PHY 301.

In one embodiment, the first information in the present disclosure is generated by the PHY 301.

In one embodiment, the first information in the present disclosure is generated by the RRC sublayer 306.

In one embodiment, the first information in the present disclosure is transmitted from the MAC sublayer 302 to the PHY 301.

In one embodiment, the first signaling in the present disclosure is generated by the PHY 301.

In one embodiment, the first radio signal in the present disclosure is generated by the PHY 301.

In one embodiment, the first radio signal in the present disclosure is generated by the RRC sublayer 306.

In one embodiment, the first radio signal in the present disclosure is transmitted from the MAC sublayer 302 to the PHY 301.

In one embodiment, the first target information in the present disclosure is generated by the PHY 301.

Embodiment 4

Figure 4:
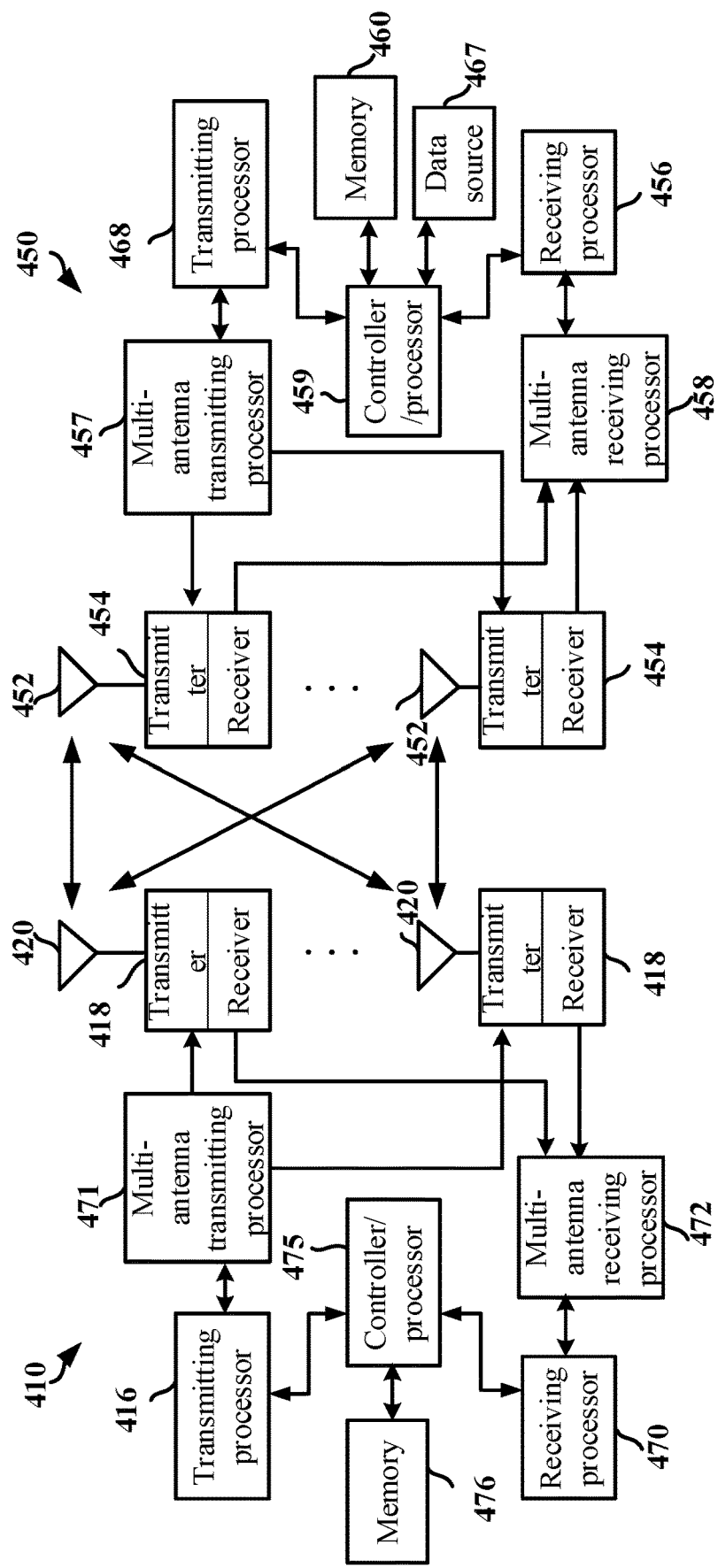
FIG. 4 illustrates a schematic diagram of a first communication device and a second communication device according to one embodiment of the present disclosure.

Embodiment 4 illustrates a schematic diagram of a first communication device and a second communication device according to the present disclosure, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 implements the functionality of the L2 layer. In the transmission from the first communication device 410 to the second communication device 450, the controller/processor 475 provides header compression, encryption, packet segmentation and reordering, multiplexing between a logical channel and a transport channel and radio resource allocation of the second communication device 450 based on various priorities. The controller/processor 475 is also in charge of a retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and the mapping of signal clusters corresponding to each modulation scheme (i.e., BPSK, QPSK, M-PSK, and M-QAM, etc.). The multi-antenna transmitting processor 471 performs digital spatial precoding, including codebook-based precoding and non-codebook-based precoding, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to antennas 420.

In a transmission from the first communication device 410 to the second communication device 450, at the second communication device 450, each receiver 454 receives a signal via a corresponding antenna 452. Each receiver 454 recovers information modulated onto the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the first communication device 410. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In the transmission from the first communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication device 410 to the second communication device 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the first communication device 410. The transmitting processor 468 performs modulation and mapping, as well as channel coding, and the multi-antenna transmitting processor 457 performs digital multi-antenna spatial precoding, including codebook-based precoding and non-codebook-based precoding, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the second communication device 450 to the first communication device 410, the controller/processor 475 provides de-multiplexing between a transport channel and a logical channel, packet reassembling, decrypting, header decompression, control signal processing so as to recover a higher-layer packet from the second communication device (UE) 450. The higher-layer packet coming from the controller/processor 475 may be provided to the core network.

In one embodiment, the first node in the present disclosure comprises the second communication device 450, while the second node in the present disclosure comprises the first communication device 410.

In one subembodiment, the first node is a UE, while the second node is a UE.

In one subembodiment, the first node is a UE, while the second node is a relay node.

In one subembodiment, the first node is a relay node, while the second node is a UE.

In one subembodiment, the second communication device 450 comprises at least one controller/processor; and the at least one controller/processor is in charge of HARQ operation.

In one subembodiment, the first communication device 410 comprises at least one controller/processor; and the at least one controller/processor is in charge of HARQ operation.

In one subembodiment, the first communication device 410 comprises at least one controller/processor; and the at least one controller/processor is in charge of error detection using ACK and/or NACK as a way to support HARQ operation.

In one embodiment, the first node in the present disclosure comprises the second communication device 450, while the third node in the present disclosure comprises the first communication device 410.

In one subembodiment, the first node is a UE, while the third node is a relay node.

In one subembodiment, the first node is a UE, while the third node is a base station.

In one embodiment, the second communication device 450 comprises at least one processor and at least one memory, the at least one memory comprises computer program codes; the at least one memory and the computer program codes are configured to be used in collaboration with the at least one processor, the second communication device 450 at least receives first information, the first information indicating a first symbol set; transmits a first signaling in a first symbol group; and also transmits a first radio signal in a second symbol group; the first symbol group belongs to the first symbol set; the first signaling indicates the second symbol group, the second symbol group comprising a positive integer number of multicarrier symbols; at least one multicarrier symbol of the positive integer number of multicarrier symbols comprised by the second symbol group belongs to the first symbol set, and at least one multicarrier symbol of the positive integer number of multicarrier symbols comprised by the second symbol group does not belong to the first symbol set; a first bit sequence is used for generating the first radio signal, and the first bit sequence comprises a first bit sub-sequence and a second bit sub-sequence, and an order of the first bit sub-sequence in the first bit sequence is prior to that of the second bit sub-sequence in the first bit sequence; the first bit sub-sequence is mapped onto multicarrier symbol(s) in the second symbol group belonging to the first symbol set, while the second bit sub-sequence is mapped onto multicarrier symbol(s) in the second symbol group not belonging to the first symbol set.

In one embodiment, the second communication device 450 comprises a memory that stores computer readable instruction program, the computer readable instruction program generates actions when executed by at least one processor, which include: receiving first information, the first information indicating a first symbol set; transmitting a first signaling in a first symbol group; and also transmitting a first radio signal in a second symbol group; the first symbol group belongs to the first symbol set; the first signaling indicates the second symbol group, the second symbol group comprising a positive integer number of multicarrier symbols; at least one multicarrier symbol of the positive integer number of multicarrier symbols comprised by the second symbol group belongs to the first symbol set, and at least one multicarrier symbol of the positive integer number of multicarrier symbols comprised by the second symbol group does not belong to the first symbol set; a first bit sequence is used for generating the first radio signal, and the first bit sequence comprises a first bit sub-sequence and a second bit sub-sequence, and an order of the first bit sub-sequence in the first bit sequence is prior to that of the second bit sub-sequence in the first bit sequence; the first bit sub-sequence is mapped onto multicarrier symbol(s) in the second symbol group belonging to the first symbol set, while the second bit sub-sequence is mapped onto multicarrier symbol(s) in the second symbol group not belonging to the first symbol set.

In one embodiment, the first communication device 410 comprises at least one processor and at least one memory, the at least one memory comprises computer program codes; the at least one memory and the computer program codes are configured to be used in collaboration with the at least one processor. The first communication device 410 at least transmits first information, the first information indicating a first symbol set; monitors a first signaling in a first symbol group; and receives a first radio signal in a second symbol group when the first signaling is detected; the first symbol group belongs to the first symbol set; the first signaling indicates the second symbol group, the second symbol group comprising a positive integer number of multicarrier symbols; at least one multicarrier symbol of the positive integer number of multicarrier symbols comprised by the second symbol group belongs to the first symbol set, and at least one multicarrier symbol of the positive integer number of multicarrier symbols comprised by the second symbol group does not belong to the first symbol set; a first bit sequence is used for generating the first radio signal, and the first bit sequence comprises a first bit sub-sequence and a second bit sub-sequence, and an order of the first bit sub-sequence in the first bit sequence is prior to that of the second bit sub-sequence in the first bit sequence; the first bit sub-sequence is mapped onto multicarrier symbol(s) in the second symbol group belonging to the first symbol set, while the second bit sub-sequence is mapped onto multicarrier symbol(s) in the second symbol group not belonging to the first symbol set.

In one embodiment, the first communication device 410 comprises a memory that stores computer readable instruction program, the computer readable instruction program generates actions when executed by at least one processor, which include: transmitting first information, the first information indicating a first symbol set; monitoring a first signaling in a first symbol group; and receiving a first radio signal in a second symbol group when the first signaling is detected; the first symbol group belongs to the first symbol set; the first signaling indicates the second symbol group, the second symbol group comprising a positive integer number of multicarrier symbols; at least one multicarrier symbol of the positive integer number of multicarrier symbols comprised by the second symbol group belongs to the first symbol set, and at least one multicarrier symbol of the positive integer number of multicarrier symbols comprised by the second symbol group does not belong to the first symbol set; a first bit sequence is used for generating the first radio signal, and the first bit sequence comprises a first bit sub-sequence and a second bit sub-sequence, and an order of the first bit sub-sequence in the first bit sequence is prior to that of the second bit sub-sequence in the first bit sequence; the first bit sub-sequence is mapped onto multicarrier symbol(s) in the second symbol group belonging to the first symbol set, while the second bit sub-sequence is mapped onto multicarrier symbol(s) in the second symbol group not belonging to the first symbol set.

In one embodiment, at least one of the antenna 452, the receiver 454, the multi-antenna receiving processor 458, the receiving processor 456, the controller/processor 459, the memory 460 or the data source 467 is used for receiving a second signaling in the present disclosure.

In one embodiment, at least one of the antenna 452, the receiver 454, the multi-antenna receiving processor 458, the receiving processor 456, the controller/processor 459, the memory 460 or the data source 467 is used for receiving first information in the present disclosure.

In one embodiment, at least one of the antenna 452, the transmitter 454, the multi-antenna transmitting processor 458, the transmitting processor 468, the controller/processor 459, the memory 460 or the data source 467 is used for transmitting a first signaling in a first symbol group in the present disclosure.

In one embodiment, at least one of the antenna 452, the transmitter 454, the multi-antenna transmitting processor 458, the transmitting processor 468, the controller/processor 459, the memory 460 or the data source 467 is used for transmitting a first radio signal in a second symbol group in the present disclosure.

In one embodiment, at least one of the antenna 452, the receiver 454, the multi-antenna receiving processor 458, the receiving processor 456, the controller/processor 459, the memory 460 or the data source 467 is used for detecting first target information in a third symbol group in the present disclosure.

In one embodiment, at least one of the antenna 420, the transmitter 418, the multi-antenna transmitting processor 471, the transmitting processor 416, the controller/processor 475 or the memory 476 is used for transmitting a second signaling in the present disclosure.

In one embodiment, at least one of the antenna 420, the transmitter 418, the multi-antenna transmitting processor 471, the transmitting processor 416, the controller/processor 475 or the memory 476 is used for transmitting first information in the present disclosure.

In one embodiment, at least one of the antenna 420, the receiver 418, the multi-antenna receiving processor 472, the receiving processor 470, the controller/processor 475 or the memory 476 is used for receiving a first signaling in a first symbol group in the present disclosure.

In one embodiment, at least one of the antenna 420, the receiver 418, the multi-antenna receiving processor 472, the receiving processor 470, the controller/processor 475 or the memory 476 is used for receiving a first radio signal in a second symbol group in the present disclosure.

In one embodiment, at least one of the antenna 420, the transmitter 418, the multi-antenna transmitting processor 471, the transmitting processor 416, the controller/processor 475 or the memory 476 is used for transmitting first target information in a third symbol group in the present disclosure.

Embodiment 5

Figure 5:
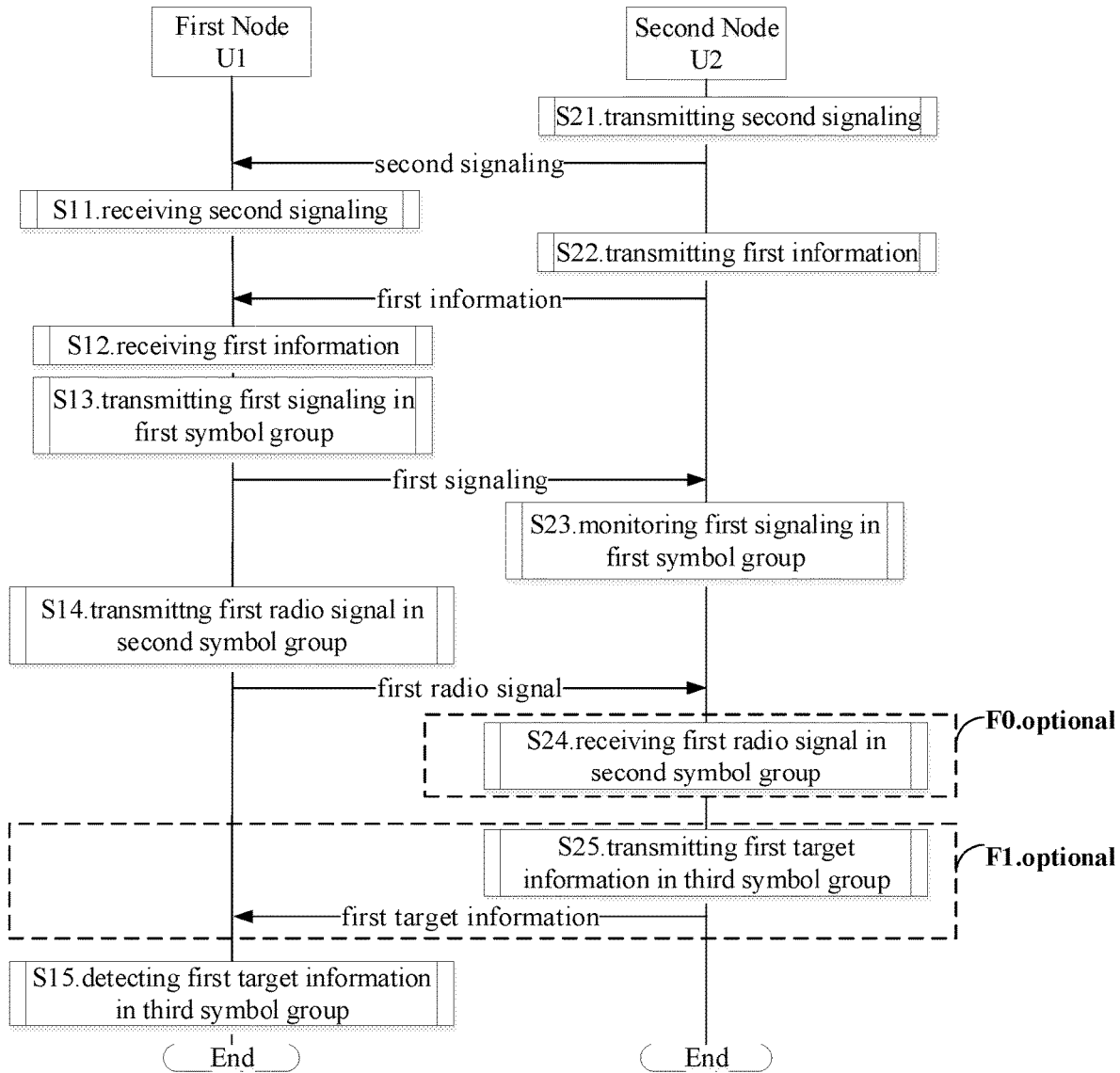
FIG. 5 illustrates a flowchart of radio signal transmission according to one embodiment of the present disclosure.

Embodiment 5 illustrates a flowchart of radio signal transmission according to one embodiment of the present disclosure, as shown in FIG. 5. In FIG. 5, a first node U1 and a second node U2 are in communication via an air interface. In FIG. 5, steps respectively marked by a box F0 and a box F1 are optional.

The first node U1 receives a second signaling in step S11; receives first information in step S12; and transmits a first signaling in a first symbol group in step S13; transmits a first radio signal in a second symbol group in step S14; and detects first target information in a third symbol group in step S15.

The second node U2 transmits a second signaling in step S21; transmits first information in step S22; and monitors a first signaling in a first symbol group in step S23; receives a first radio signal in a second symbol group in step S24; and transmits first target information in a third symbol group in step S25.

In Embodiment 5, the first information indicates a first symbol set; the first symbol group belongs to the first symbol set; the first signaling indicates the second symbol group, the second symbol group comprising a positive integer number of multicarrier symbols; at least one multicarrier symbol of the positive integer number of multicarrier symbols comprised by the second symbol group belongs to the first symbol set, and at least one multicarrier symbol of the positive integer number of multicarrier symbols comprised by the second symbol group does not belong to the first symbol set; a first bit sequence is used by the first node U1 for generating the first radio signal, the first bit sequence comprises a first bit sub-sequence and a second bit sub-sequence, and an order of the first bit sub-sequence in the first bit sequence is prior to that of the second bit sub-sequence in the first bit sequence; the first bit sub-sequence is mapped by the first node U1 onto multicarrier symbol(s) in the second symbol group belonging to the first symbol set, while the second bit sub-sequence is mapped by the first node U1 onto multicarrier symbol(s) in the second symbol group not belonging to the first symbol set; the second signaling indicates a second symbol set; the second symbol set comprises the first symbol set, and the second symbol group belongs to the second symbol set; the first target information indicates whether the first radio signal is correctly decoded by the second node U2.

In one embodiment, the first symbol group is used by the first node U1 for indicating the third symbol group; and the third symbol group is unrelated to a number of and respective position(s) of multicarrier symbol(s) comprised by a second symbol sub-group; the second symbol sub-group comprises each multicarrier symbol in the second symbol group that does not belong to the first symbol set.

In one embodiment, a first symbol sub-group is used by the first node U1 for indicating the third symbol group; the third symbol group is unrelated to a number of and respective position(s) of multicarrier symbol(s) comprised by a second symbol sub-group; the first symbol sub-group comprises each multicarrier symbol in the second symbol group that belongs to the first symbol set; the second symbol sub-group comprises each multicarrier symbol in the second symbol group that does not belong to the first symbol set.

In one embodiment, the first information comprises a first bitmap; the first bitmap is used for indicating a first-type symbol group comprised by a first target time-frequency resource block in time domain, and the first target time-frequency resource block is one of a positive integer number of first-type time-frequency resource block(s).

In one embodiment, the first information comprises an index of a first reference pattern in a first pattern set; the first reference pattern is used for indicating a first-type symbol group comprised by a first target time-frequency resource block in time domain, and the first target time-frequency resource block is one of a positive integer number of first-type time-frequency resource block(s); the first pattern set comprises a positive integer number of first-type pattern(s), and the first reference pattern is one of the positive integer number of first-type pattern(s).

In one embodiment, the step marked by the box F0 in FIG. 5 exists.

In one embodiment, the step marked by the box F0 in FIG. 5 does not exist.

In one embodiment, when the second symbol group is used by the second node U2 for SL receiving, the step marked by the box F0 in FIG. 5 exists.

In one embodiment, when the second symbol group cannot be used by the second node U2 for SL receiving, the step marked by the box F0 in FIG. 5 does not exist.

In one embodiment, when the second symbol group is used by the second node U2 for receiving a radio signal transmitted from any communication other than the first node U1, the step marked by the box F0 in FIG. 5 does not exist.

In one embodiment, the step marked by the box F1 in FIG. 5 exists.

In one embodiment, the step marked by the box F1 in FIG. 5 does not exist.

In one embodiment, when the first radio signal is correctly decoded by the second node U2, the step marked by the box F1 in FIG. 5 exists.

In one embodiment, when the first radio signal is not correctly decoded by the second node U2, the step marked by the box F1 in FIG. 5 does not exist.

In one embodiment, when a distance between the second node U2 and the first node U1 is within a given communication coverage, the step marked by the box F1 in FIG. 5 exists.

In one embodiment, when a distance between the second node U2 and the first node U1 is beyond a given communication coverage, the step marked by the box F1 in FIG. 5 does not exist.

In one embodiment, the phrase of monitoring a first signaling in a first symbol group refers to receiving the first signaling based on blind detection, namely, the second node U2 receives a signal in the first symbol group and performs decoding, if the decoding is determined as correct according to a CRC bit, it is then determined that the first signaling is successfully received in the first symbol group; otherwise, it is determined that the first signaling is not successfully detected in the first symbol group.

In one embodiment, the phrase of monitoring a first signaling in a first symbol group refers to receiving the first signaling based on coherent detection, namely, the second node U2 performs coherent reception on a radio signal employing an RS sequence corresponding to the first signaling in the first symbol group, and measures energy of a signal obtained by the coherent reception; if the energy of the signal obtained by the coherent reception is greater than a first given threshold, it is determined that the first signaling is successfully received in the first symbol group; otherwise, it is determined that the first signaling is not successfully detected in the first symbol group.

In one embodiment, the phrase of monitoring a first signaling in a first symbol group refers to receiving the first signaling based on energy detection, namely, the second node U2 senses energy of a radio signal in the first symbol group and averages in time to obtain a received energy; if the received energy is greater than a second given threshold, it is determined that the first signaling is successfully received in the first symbol group; otherwise, it is determined that the first signaling is not successfully detected in the first symbol group.

In one embodiment, the second symbol set comprises a positive integer number of multicarrier symbols.

In one embodiment, the positive integer number of multicarrier symbols comprised by the second symbol set are reserved for SL transmissions.

In one embodiment, the positive integer number of multicarrier symbols comprised by the second symbol set are reserved for UL transmissions.

In one embodiment, the positive integer number of multicarrier symbols comprised by the second symbol set are reserved for UL transmissions or SL transmissions.

In one embodiment, the positive integer number of multicarrier symbols comprised by the second symbol set are used for V2X.

In one embodiment, the positive integer number of multicarrier symbols comprised by the second symbol set are a part of a V2X resource pool.

In one embodiment, the positive integer number of multicarrier symbols comprised by the second symbol set are a part of an SL resource pool.

In one embodiment, at least one of the positive integer number of multicarrier symbols comprised by the second symbol set is a UL symbol.

In one embodiment, each of the positive integer number of multicarrier symbols comprised by the second symbol set is a UL symbol.

In one embodiment, at least one of the positive integer number of multicarrier symbols comprised by the second symbol set is a DL symbol.

In one embodiment, at least one of the positive integer number of multicarrier symbols comprised by the second symbol set is a Flexible symbol.

In one embodiment, one of the positive integer number of multicarrier symbols comprised by the second symbol set is either a UL symbol or a Flexible symbol.

In one embodiment, one of the positive integer number of multicarrier symbols comprised by the second symbol set is one of a UL symbol, a Flexible symbol and a DL symbol.

In one embodiment, the second symbol set comprises Q1 first-type symbol groups, and any of the Q1 first-type symbol groups comprises a positive integer number of multicarrier symbol(s), Q1 being a positive integer no less than the Q.

In one embodiment, the second symbol set is configured.

In one embodiment, the second symbol set is configured by a base station.

In one embodiment, the second symbol set is pre-configured.

In one embodiment, the second symbol set is pre-defined.

In one embodiment, the second symbol set is configured by a higher-layer signaling.

In one embodiment, the second symbol set is configured by an RRC layer signaling.

In one embodiment, the second symbol set is configured by an RRC IE.

In one embodiment, the second symbol set is configured by a dynamic signaling.

In one embodiment, the second symbol set is indicated by DCI.

In one embodiment, the second symbol set is indicated by SCI.

In one embodiment, at least one of the Q1 first-type symbol groups is obtained by the first node U1 through Sensing.

In one embodiment, at least one of the Q1 first-type symbol groups is obtained by the first node U1 through Resource Selection.

In one embodiment, at least one of the Q1 first-type symbol groups is obtained by the first node U1 through Resource Re-selection.

In one embodiment, at least one of the Q1 first-type symbol groups is obtained by the first node U1 according to a received signal quality.

In one embodiment, at least one of the Q1 first-type symbol groups is selected by the second node U2 itself.

In one embodiment, at least one of the Q1 first-type symbol groups is obtained by the second node U2 through Sensing.

In one embodiment, at least one of the Q1 first-type symbol groups is obtained by the second node U2 through Resource Selection.

In one embodiment, at least one of the Q1 first-type symbol groups is obtained by the second node U2 through Resource Re-selection.

In one embodiment, at least one of the Q1 first-type symbol groups is obtained by the second node U2 according to a received signal quality.

In one embodiment, at least one of the Q1 first-type symbol groups comprises a positive integer number of time-domain resource unit(s) in time domain.

In one embodiment, the positive integer number of time-domain resource units comprised by at least one of the Q1 first-type symbol groups are consecutive in time.

In one embodiment, among the positive integer number of time-domain resource units comprised by at least one of the Q1 first-type symbol groups, at least two time-domain resource units are non-consecutive in time.

In one embodiment, at least two multicarrier symbols among the positive integer number of multicarrier symbols comprised by the second symbol set are not adjacent.

In one embodiment, at least two multicarrier symbols among the positive integer number of multicarrier symbols comprised by the second symbol set are adjacent.

In one embodiment, at least one of the Q1 first-type symbol groups comprises a positive integer number of frequency-domain resource unit(s) in frequency domain.

In one embodiment, the positive integer number of frequency-domain resource units comprised by at least one of the Q1 first-type symbol groups are consecutive in frequency domain.

In one embodiment, among the positive integer number of frequency-domain resource units comprised by at least one of the Q1 first-type symbol groups, at least two frequency-domain resource units are non-consecutive in frequency domain.

In one embodiment, at least one of the Q1 first-type symbol groups comprises a positive integer number of time-frequency resource unit(s).

In one embodiment, the positive integer number of time-frequency resource units comprised by at least one of the Q1 first-type symbol groups are consecutive in time domain.

In one embodiment, the positive integer number of time-frequency resource units comprised by at least one of the Q1 first-type symbol groups are consecutive in frequency domain.

In one embodiment, among the positive integer number of time-frequency resource units comprised by at least one of the Q1 first-type symbol groups, at least two time-frequency resource units are non-consecutive in time domain.

In one embodiment, among the positive integer number of time-frequency resource units comprised by at least one of the Q1 first-type symbol groups, at least two time-frequency resource units are non-consecutive in frequency domain.

In one embodiment, at least one of the Q1 first-type symbol groups comprises a positive integer number of RE(s).

In one embodiment, time-domain resource unit(s) occupied by at least one of the Q1 first-type symbol groups in time domain is(are) a positive integer number of subframe(s).

In one embodiment, time-domain resource unit(s) occupied by at least one of the Q1 first-type symbol groups in time domain is(are) a positive integer number of slot(s).

In one embodiment, frequency-domain resource unit(s) occupied by at least one of the Q1 first-type symbol groups is(are) a positive integer number of subchannel(s).

In one embodiment, the signal quality is an average power of signals received in a positive integer number of time-frequency resource units.

In one subembodiment, the signals received in the positive integer number of time-frequency resource units include an RS, a data signal, an interfering signal and a noisy signal.

In one embodiment, the signal quality comprises a Reference Signal Receiving Power (RSRP).

In one embodiment, the signal quality comprises a Reference Signal Receiving Quality (RSRQ).

In one embodiment, the signal quality comprises a Received Signal Strength Indicator (RSSI).

In one embodiment, the signal quality comprises a Signal-to-Noise Ratio (SNR).

In one embodiment, the signal quality comprises a Signal to Interference plus Noise Ratio (SINR).

In one embodiment, the second symbol set comprises the first symbol set.

In one embodiment, the first symbol set belongs to the second symbol set.

In one embodiment, the positive integer number of multicarrier symbols comprised by the second symbol set comprise the positive integer number of multicarrier symbol(s) comprised by the first symbol set.

In one embodiment, the positive integer number of multicarrier symbol(s) comprised by the first symbol set belongs (belong) to the second symbol set.

In one embodiment, any multicarrier symbol comprised in the first symbol set is a multicarrier symbol in the second symbol set.

In one embodiment, the Q1 first-type symbol groups comprised by the second symbol set comprise the Q first-type symbol groups comprised by the first symbol set.

In one embodiment, any of the Q first-type symbol groups comprised by the first symbol set is one of the Q1 first-type symbol groups comprised by the second symbol set.

In one embodiment, a multicarrier symbol comprised in the second symbol set is not any multicarrier symbol in the first symbol set.

In one embodiment, at least one of the positive integer number of multicarrier symbols comprised by the second symbol set does not belong to the first symbol set.

In one embodiment, the first information is used for indicating the first symbol set from the second symbol set.

In one embodiment, the first information comprises an index of a first-type symbol group comprised in the first symbol set among the Q1 first-type symbol groups comprised by the second symbol set.

In one embodiment, the first information comprises a first bitmap, the first bitmap corresponds to the Q1 first-type symbol groups comprised by the second symbol set respectively, and the first bitmap indicates whether multicarrier symbol(s) in any of the Q1 first-type symbol groups belongs (belong) to the first symbol set.

In one subembodiment, the first bitmap and the slot format jointly indicate whether any multicarrier symbol in any of the Q1 first-type symbol groups belongs to the first symbol set.

In one embodiment, the first information comprises a first reference pattern, and the first reference pattern is used for indicating the slot format of a first-type symbol group of the Q1 first-type symbol groups.

In one embodiment, the second signaling is transmitted via broadcast.

In one embodiment, the second signaling is transmitted via groupcast.

In one embodiment, the second signaling is transmitted via unicast.

In one embodiment, the second signaling is cell-specific.

In one embodiment, the second signaling is UE-specific.

In one embodiment, the second signaling is transmitted through an SL-SCH.

In one embodiment, the second signaling is transmitted through a PSCCH.

In one embodiment, the second signaling is transmitted through a PSSCH.

In one embodiment, the second signaling is transmitted through a PSCCH and a PSSCH.

In one embodiment, the second signaling is transmitted through a DL-SCH.

In one embodiment, the second signaling is transmitted through a PDCCH.

In one embodiment, the second signaling is transmitted through a PDSCH.

In one embodiment, the second signaling is transmitted through a PDCCH and a PDSCH.

In one embodiment, the second signaling comprises all or part of a higher-layer signaling.

In one embodiment, the second signaling comprises all or part of an RRC layer signaling.

In one embodiment, the second signaling comprises one or more fields in an RRC IE.

In one embodiment, the second signaling comprises one or more fields in a SIB.

In one embodiment, the second signaling comprises all or part of a MAC layer signaling.

In one embodiment, the second signaling comprises one or more fields in a MAC CE.

In one embodiment, the second signaling comprises one or more fields in a PHY layer signaling.

In one embodiment, the second signaling comprises one or more fields in a piece of SCI.

In one embodiment, the second signaling comprises one or more fields in a piece of DCI.

In one embodiment, the second signaling is semi-statically configured.

In one embodiment, the second signaling is dynamically configured.

In one embodiment, the second signaling indicates resources of SL.

In one embodiment, the second signaling is used for indicating the second symbol set.

In one embodiment, the second signaling explicitly indicates the second symbol set.

In one embodiment, the second signaling implicitly indicates the second symbol set.

In one embodiment, the second signaling indicates the positive integer number of multicarrier symbols comprised by the second symbol set.

In one embodiment, the second signaling indicates the Q1 first-type symbol groups comprised by the second symbol set.

In one embodiment, the second signaling indicates time-frequency resource units occupied by the second symbol set.

In one embodiment, the second signaling indicates time-frequency resource unit(s) occupied by any of the Q1 first-type symbol groups comprised by the second symbol set.

In one embodiment, the second signaling comprises a second bitmap, the second bitmap corresponds to a positive integer number of time-domain resource unit(s) respectively, and the second bitmap indicates whether multicarrier symbol(s) in any of the positive integer number of time-domain resource unit(s) belongs (belong) to the second symbol set.

In one subembodiment, any of the positive integer number of time-domain resource unit(s) comprises a positive integer number of multicarrier symbol(s).

In one subembodiment, the second bitmap and the slot format jointly indicate whether any multicarrier symbol in any of the positive integer number of time-domain resource unit(s) belongs to the second symbol set.

In one embodiment, the second signaling comprises a second reference pattern, and the second reference pattern is used for indicating a slot format of a time-domain resource unit of a positive integer number of time-domain resource unit(s).

In one embodiment, the slot format indicates configurations of a UL symbol, a DL symbol and a Flexible symbol comprised in a time-domain resource unit.

In one embodiment, the slot format indicates configurations of a UL symbol and a DL symbol comprised in a time-domain resource unit.

In one embodiment, the slot format indicates configuration of a Flexible symbol comprised in a time-domain resource unit.

In one embodiment, the second signaling comprises proportioning of uplink and downlink resources.

In one embodiment, the second signaling comprises TDD-UL-DL-Config.

In one embodiment, the second signaling comprises a parameter TDD-UL-DL-ConfigurationCommon.

In one embodiment, the second signaling comprises a parameter TDD-UL-DL-ConfigDedicated.

In one embodiment, the second signaling comprises a parameter TDD-UL-DL-Pattern.

In one embodiment, the second signaling comprises slot format.

In one embodiment, the second signaling comprises SFI.

Embodiment 6

Figure 6:
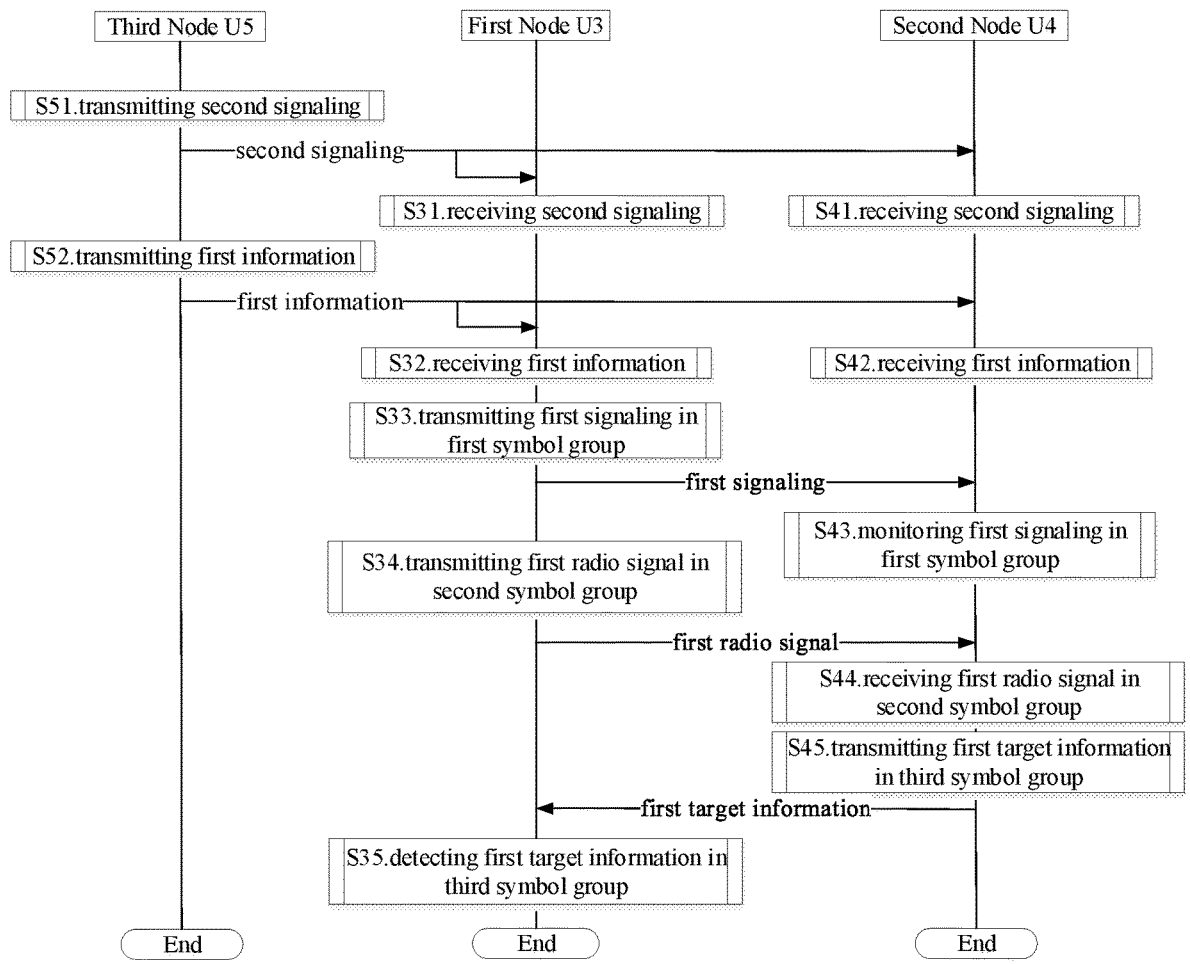
FIG. 6 illustrates another flowchart of radio signal transmission according to one embodiment of the present disclosure.

Embodiment 6 illustrates a flowchart of radio signal transmission according to one embodiment of the present disclosure, as shown in FIG. 6. In FIG. 6, a first node U3, a second node U4 and a third node U5 are in communication via an air interface.

The first node U3 receives a second signaling in step S31; receives first information in step S32; and transmits a first signaling in a first symbol group in step S33; transmits a first radio signal in a second symbol group in step S34; and detects first target information in a third symbol group in step S35.

The second node U4 receives a second signaling in step S41; receives first information in step S42; and monitors a first signaling in a first symbol group in step S43; receives a first radio signal in a second symbol group in step S44; and transmits first target information in a third symbol group in step S45.

The third node U5 transmits a second signaling in step S51; and transmits first information in step S52.

In Embodiment 6, a transmitter of the first information and a transmitter of the first radio signal are non-co-located; a transmitter of the second signaling and a transmitter of the first information are co-located.

In one embodiment, a Backhaul Link between a transmitter of the first information and a transmitter of the first radio signal is not ideal (i.e., delay is not negligible).

In one embodiment, a transmitter of the first information and a transmitter of the first radio signal do not share a same set of Baseband equipment.

In one embodiment, a Backhaul Link between a transmitter of the second signaling and a transmitter of the first information is ideal (i.e., delay is negligible).

In one embodiment, a transmitter of the second signaling and a transmitter of the first information share a same set of Baseband equipment.

In one embodiment, a transmitter of the first information is the third node U5.

In one embodiment, a target receiver of the first information comprises the first node U3 and the second node U4.

In one embodiment, a transmitter of the second signaling is the third node U5.

In one embodiment, a target receiver of the second signaling comprises the first node U3 and the second node U4.

In one embodiment, the third node U5 is a base station, while the first node U3 and the second node U4 are UEs.

In one embodiment, the third node U5 is a relay, while the first node U3 and the second node U4 are UEs.

In one embodiment, the third node U5 is a base station, the first node U3 is a relay, and the second node U4 is a UE.

In one embodiment, the third node U5 and the first node U3 are relays, and the second node U4 is a UE.

In one embodiment, the first node U3 and the second node U4 are located within the coverage of a serving cell of the third node U5.

In one embodiment, the first node U3 is located within the coverage of a serving cell of the third node U5, while the second node U4 is located out of the coverage of the serving cell of the third node U5.

In one embodiment, the phrase of detecting a first target signal in a third symbol group refers to receiving the first target signal based on blind detection, namely, the first node U3 receives a signal in the third symbol group and performs decoding, when the decoding is determined to be correct according to a CRC bit, it is determined that the first target signal is successfully received in the third symbol group; otherwise, it is determined that the first target signal is not successfully detected in the third symbol group.

In one embodiment, the phrase of detecting a first target signal in a third symbol group refers to receiving the first target signal based on coherent detection, namely, the first node U3 performs coherent reception on a radio signal in the third symbol group, employing an RS sequence corresponding to the first target signal, and measures energy of a signal obtained by the coherent reception; when the energy of the signal obtained by the coherent reception is greater than a third given threshold, it is determined that the first target signal is successfully received in the third symbol group; otherwise, it is determined that the first target signal is not successfully detected in the third symbol group.

In one embodiment, the phrase of detecting a first target signal in a third symbol group refers to receiving the first target signal based on energy detection, namely, the first node U3 senses energy of a radio signal in the third symbol group and averages in time to obtain a received energy; when the received energy is greater than a fourth given threshold, it is determined that the first target signal is successfully received in the third symbol group; otherwise, it is determined that the first target signal is not successfully detected in the third symbol group.

Embodiment 7

Figure 7:
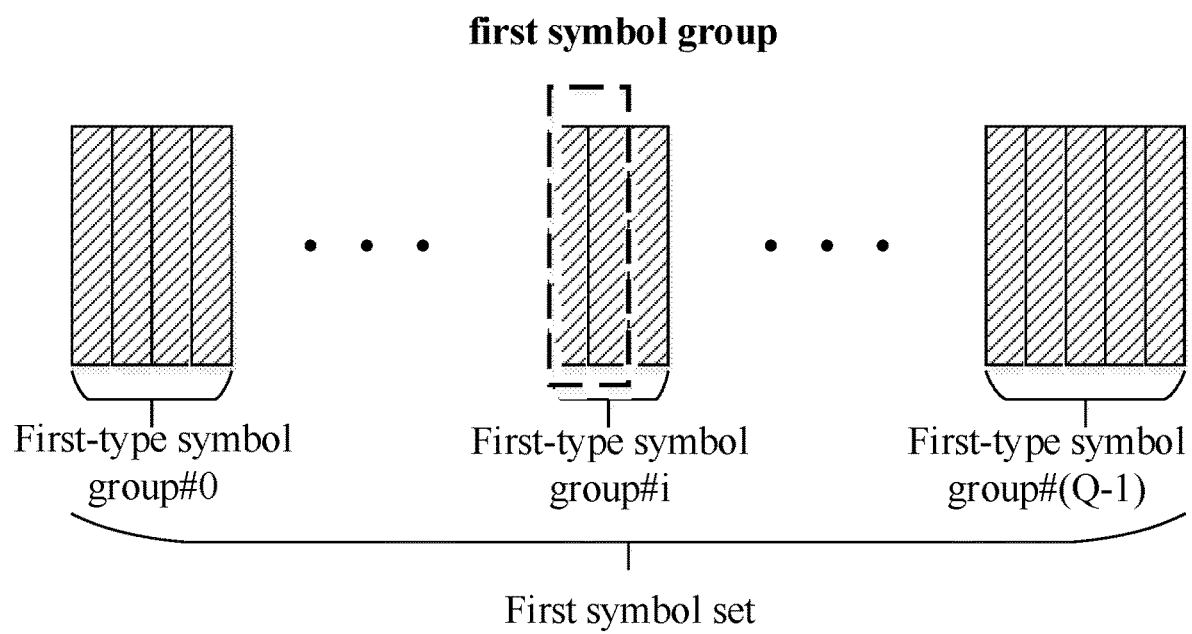
FIG. 7 illustrates a schematic diagram of relationship between a first symbol group and a first symbol set according to one embodiment of the present disclosure.

Embodiment 7 illustrates a schematic diagram of relationship between a first symbol group and a first symbol set according to one embodiment of the present disclosure, as shown in FIG. 7. In FIG. 7, each slash-filled rectangle framed with solid lines represents a multicarrier symbol in a first symbol set in the present disclosure.

In Embodiment 7, the first symbol set comprises Q first-type symbol groups, and any of the Q first-type symbol groups comprises a positive integer number of multicarrier symbol(s); the first symbol group belongs to one of the Q first-type symbol groups comprised by the first symbol set; and Q is a positive integer.

In one embodiment, the first symbol group comprises a positive integer number of multicarrier symbol(s).

In one embodiment, the first symbol set comprises the first symbol group.

In one embodiment, the first symbol group belongs to the first symbol set.

In one embodiment, any multicarrier symbol of the positive integer number of multicarrier symbol(s) comprised by the first symbol group belongs to the first symbol set.

In one embodiment, any multicarrier symbol of the positive integer number of multicarrier symbol(s) comprised by the first symbol group is one of the positive integer number of multicarrier symbols comprised by the first symbol set.

In one embodiment, the first symbol group belongs to one of the Q first-type symbol groups comprised by the first symbol set.

In one embodiment, any multicarrier symbol of the positive integer number of multicarrier symbol(s) comprised by the first symbol group is one of the positive integer number of multicarrier symbol(s) comprised by one of the Q first-type symbol groups.

In one embodiment, the first symbol group is one of the Q first-type symbol groups comprised by the first symbol set.

In one embodiment, the positive integer number of multicarrier symbol(s) comprised by the first symbol group is(are) the same as the positive integer number of multicarrier symbol(s) comprised by one of the Q first-type symbol groups.

In one embodiment, indexes of the Q first-type symbol groups in the first symbol set are 0, 1 . . . , i . . . , and (Q−1), respectively, where i is a non-negative integer less than the Q; a first-type symbol group where the first symbol group is located is indexed by i in the first symbol set.

In one subembodiment, the first symbol group belongs to the i-th first-type symbol group among the first symbol set.

In one subembodiment, the first symbol group is the i-th first-type symbol group among the first symbol set.

In one embodiment, the first symbol set comprises X multicarrier symbols, and the first symbol group comprises X1 multicarrier symbol(s), X being a positive integer and X1 being a positive integer no greater than the X.

In one subembodiment, each of the X1 multicarrier symbol(s) in the first symbol group belongs to the X multicarrier symbols in the first symbol set.

In one subembodiment, the X multicarrier symbols in the first symbol set comprise any of the X1 multicarrier symbol(s) in the first symbol group.

In one embodiment, the first symbol group is Semi-static configured.

In one embodiment, the first symbol group is Pre-defined.

In one embodiment, the first symbol group is Pre-configured.

In one embodiment, the first symbol group is fixed.

In one embodiment, the first symbol group is configured by a higher-layer signaling.

In one embodiment, the first symbol group is configured by an RRC signaling.

In one embodiment, the first symbol group is configured by an RRC IE.

In one embodiment, the first symbol group is configured by a SIB.

In one embodiment, the first symbol group comprises a PSBCH.

In one embodiment, the first symbol group comprises a PSCCH.

In one embodiment, the first symbol group comprises a PSFCH.

In one embodiment, the first symbol group comprises a PSSCH.

In one embodiment, the first symbol group comprises a PSCCH and a PSFCH.

In one embodiment, the first symbol group comprises a PSCCH and a PSSCH.

In one embodiment, the first symbol group comprises a PSCCH, a PSSCH and a PSFCH.

In one embodiment, the first symbol group comprises a PUCCH.

In one embodiment, the first symbol group comprises a PUSCH.

In one embodiment, the first symbol group comprises a PUCCH and a PUSCH.

In one embodiment, the first symbol group comprises a PRACH.

In one embodiment, at least one of the positive integer number of multicarrier symbol(s) comprised by the first symbol group is used for transmitting Sidelink Control Information (SCI).

In one embodiment, any of the positive integer number of multicarrier symbol(s) comprised by the first symbol group is used for transmitting SCI.

In one embodiment, at least one of the positive integer number of multicarrier symbol(s) comprised by the first symbol group comprises a PSCCH.

In one embodiment, any of the positive integer number of multicarrier symbol(s) comprised by the first symbol group comprises a PSCCH.

In one embodiment, at least one of the positive integer number of multicarrier symbol(s) comprised by the first symbol group belongs to a PSCCH.

In one embodiment, any of the positive integer number of multicarrier symbol(s) comprised by the first symbol group belongs to a PSCCH.

In one embodiment, at least one of the positive integer number of multicarrier symbol(s) comprised by the first symbol group is used for transmitting Sidelink Feedback Information (SFI).

In one embodiment, any of the positive integer number of multicarrier symbol(s) comprised by the first symbol group is used for transmitting SFI.

In one embodiment, the SFI comprises Hybrid Automatic Repeat Request (HARQ) information.

In one embodiment, the SFI comprises Hybrid Automatic Repeat request-Acknowledge (HARQ-ACK) information.

In one embodiment, the SFI comprises Hybrid Automatic Repeat request-Acknowledge (HARQ-NACK) information.

In one embodiment, the SFI comprises Channel State Information (CSI).

In one embodiment, the SFI comprises Channel Quality Information (CQI).

In one embodiment, the SFI comprises Reference Signal Receiving Power (RSRP).

In one embodiment, the SFI comprises Reference Signal Receiving Quality (RSRQ).

In one embodiment, at least one of the positive integer number of multicarrier symbol(s) comprised by the first symbol group comprises a PSFCH.

In one embodiment, any of the positive integer number of multicarrier symbol(s) comprised by the first symbol group comprises a PSFCH.

In one embodiment, at least one of the positive integer number of multicarrier symbol(s) comprised by the first symbol group belongs to a PSFCH.

In one embodiment, any of the positive integer number of multicarrier symbol(s) comprised by the first symbol group belongs to a PSFCH.

In one embodiment, at least one of the positive integer number of multicarrier symbol(s) comprised by the first symbol group is used for transmitting Uplink Control Information (UCI).

In one embodiment, any of the positive integer number of multicarrier symbol(s) comprised by the first symbol group is used for transmitting UCI.

In one embodiment, the UCI comprises HARQ information.

In one embodiment, the UCI comprises HARQ-ACK information.

In one embodiment, the UCI comprises HARQ-NACK information.

In one embodiment, the UCI comprises CSI.

In one embodiment, the UCI comprises CQI.

In one embodiment, the UCI comprises a Scheduling Request (SR).

In one embodiment, the UCI comprises a Precoding Matrix Indicator (PMI).

In one embodiment, the UCI comprises a Rank Indicator (RI).

In one embodiment, at least one of the positive integer number of multicarrier symbol(s) comprised by the first symbol group comprises a PUCCH.

In one embodiment, any of the positive integer number of multicarrier symbol(s) comprised by the first symbol group comprises a PUCCH.

In one embodiment, at least one of the positive integer number of multicarrier symbol(s) comprised by the first symbol group belongs to a PUCCH.

In one embodiment, any of the positive integer number of multicarrier symbol(s) comprised by the first symbol group belongs to a PUCCH.

Embodiment 8

Figure 8:
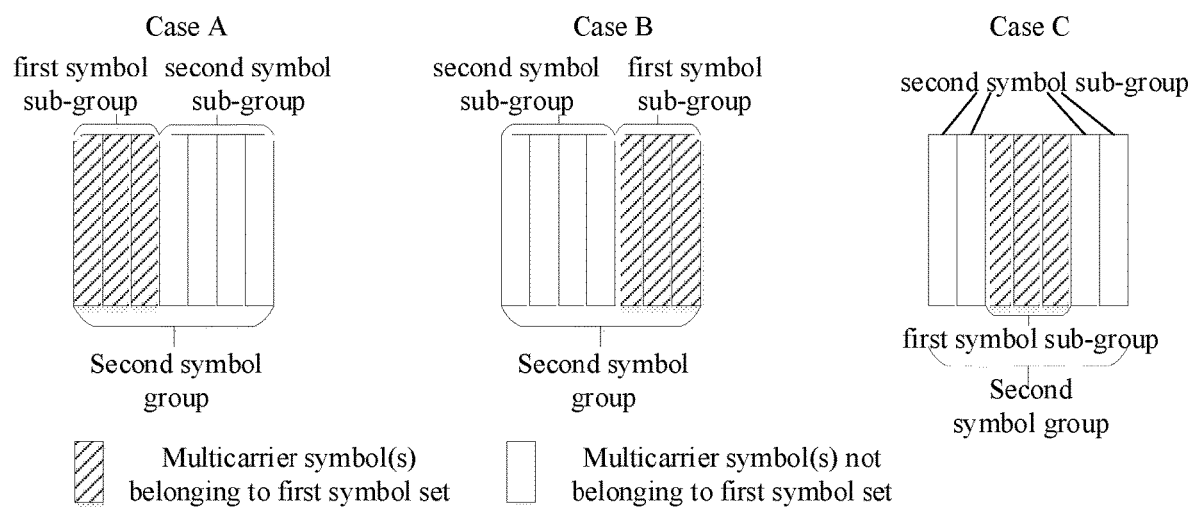
FIG. 8 illustrates a schematic diagram of relations among a second symbol group, a first symbol sub-group, a second symbol sub-group and a first symbol set according to one embodiment of the present disclosure.

Embodiment 8 illustrates a schematic diagram of relations among a second symbol group, a first symbol sub-group, a second symbol sub-group and a first symbol set according to one embodiment of the present disclosure, as shown in FIG. 8. In FIG. 8, each rectangle filled with slashes represents a multicarrier symbol belonging to a first symbol set in the present disclosure; and each blank rectangle represents a multicarrier symbol not belonging to the first symbol set in the present disclosure. In FIG. 8, as illustrated by Case A, multicarrier symbol(s) in the second symbol group belonging to the first symbol set is(are) earlier than multicarrier symbol(s) in the second symbol group not belonging to the first symbol set in time domain; as illustrated by Case B, multicarrier symbol(s) in the second symbol group belonging to the first symbol set is(are) later than multicarrier symbol(s) in the second symbol group not belonging to the first symbol set in time domain; as illustrated by Case C, multicarrier symbol(s) in the second symbol group belonging to the first symbol set is(are) located between multicarrier symbols in the second symbol group not belonging to the first symbol set.

In Embodiment 8, the second symbol group comprises a positive integer number of multicarrier symbols; at least one multicarrier symbol of the positive integer number of multicarrier symbols comprised by the second symbol group belongs to the first symbol set, and at least one multicarrier symbol of the positive integer number of multicarrier symbols comprised by the second symbol group does not belong to the first symbol set.

In one embodiment, the second symbol group comprises a positive integer number of multicarrier symbols.

In one embodiment, the first symbol set comprises at least one of the positive integer number of multicarrier symbols comprised by the second symbol group.

In one embodiment, at least one of the positive integer number of multicarrier symbols comprised by the second symbol group belongs to the positive integer number of multicarrier symbol(s) comprised by the first symbol set.

In one embodiment, at least one of the positive integer number of multicarrier symbols comprised by the second symbol group does not belong to the positive integer number of multicarrier symbol(s) comprised by the first symbol set.

In one embodiment, at least one of the positive integer number of multicarrier symbols comprised by the second symbol group is one of the positive integer number of multicarrier symbol(s) comprised by the first symbol set.

In one embodiment, at least one of the positive integer number of multicarrier symbols comprised by the second symbol group is not any of the positive integer number of multicarrier symbol(s) comprised by the first symbol set.

In one embodiment, the second symbol set comprises the first symbol set.

In one embodiment, the first symbol set belongs to the second symbol set.

In one embodiment, the positive integer number of multicarrier symbols comprised by the second symbol set comprise the positive integer number of multicarrier symbols comprised by the second symbol group.

In one embodiment, the positive integer number of multicarrier symbols comprised by the second symbol group belong to the second symbol set.

In one embodiment, any multicarrier symbol in the second symbol group is a multicarrier symbol in the second symbol set.

In one embodiment, the Q1 first-type symbol groups comprised by the second symbol set comprise the second symbol group.

In one embodiment, the second symbol group is one of the Q1 first-type symbol groups comprised by the second symbol set.

In one embodiment, a multicarrier symbol in the second symbol set is not any multicarrier symbol in the first symbol set.

In one embodiment, the second symbol group comprises the first symbol group.

In one embodiment, the first symbol group belongs to the second symbol group.

In one embodiment, each of the positive integer number of multicarrier symbol(s) comprised by the first symbol group belongs to the second symbol group.

In one embodiment, any multicarrier symbol in the first symbol group is a multicarrier symbol in the second symbol group.

In one embodiment, the second symbol group is Dynamically configured.

In one embodiment, the second symbol group is variable.

In one embodiment, the second symbol group is indicated by a physical layer signaling.

In one embodiment, the second symbol group is indicated by DCI.

In one embodiment, the second symbol group is indicated by SCI.

In one embodiment, the second symbol group comprises a PSBCH.

In one embodiment, the second symbol group comprises a PSCCH.

In one embodiment, the second symbol group comprises a PSFCH.

In one embodiment, the second symbol group comprises a PSSCH.

In one embodiment, the second symbol group comprises a PSCCH and a PSFCH.

In one embodiment, the second symbol group comprises a PSCCH and a PSSCH.

In one embodiment, the second symbol group comprises a PSCCH, a PSSCH and a PSFCH.

In one embodiment, the second symbol group comprises a PUCCH.

In one embodiment, the second symbol group comprises a PUSCH.

In one embodiment, the second symbol group comprises a PUCCH and a PUSCH.

In one embodiment, the second symbol group comprises a PRACH.

In one embodiment, at least one of the positive integer number of multicarrier symbols comprised by the second symbol group is used for transmitting SCI, and at least one of the positive integer number of multicarrier symbols comprised by the second symbol group is used for transmitting an SL-SCH.

In one embodiment, at least one of the positive integer number of multicarrier symbols comprised by the second symbol group comprises a PSCCH, and at least one of the positive integer number of multicarrier symbols comprised by the second symbol group comprises a PSSCH.

In one embodiment, at least one of the positive integer number of multicarrier symbols comprised by the second symbol group comprises a PSCCH and a PSSCH simultaneously.

In one embodiment, at least one of the positive integer number of multicarrier symbols comprised by the second symbol group belongs to a PSCCH, and at least one of the positive integer number of multicarrier symbols comprised by the second symbol group belongs to a PSSCH.

In one embodiment, at least one of the positive integer number of multicarrier symbols comprised by the second symbol group is used for transmitting SFI.

In one embodiment, at least one of the positive integer number of multicarrier symbols comprised by the second symbol group comprises a PSFCH.

In one embodiment, at least one of the positive integer number of multicarrier symbols comprised by the second symbol group comprises a PSFCH, and at least one of the positive integer number of multicarrier symbols comprised by the second symbol group comprises a PSSCH.

In one embodiment, at least one of the positive integer number of multicarrier symbols comprised by the second symbol group belongs to a PSFCH.

In one embodiment, at least one of the positive integer number of multicarrier symbols comprised by the second symbol group belongs to a PSFCH, and at least one of the positive integer number of multicarrier symbols comprised by the second symbol group belongs to a PSSCH.

In one embodiment, at least one of the positive integer number of multicarrier symbols comprised by the second symbol group is used for transmitting UCI, and at least one of the positive integer number of multicarrier symbols comprised by the second symbol group is used for transmitting an Uplink Shared Channel (UL-SCH).

In one embodiment, at least one of the positive integer number of multicarrier symbols comprised by the second symbol group is used for transmitting UCI, and at least one of the positive integer number of multicarrier symbols comprised by the second symbol group is used for transmitting UL data.

In one embodiment, the second symbol group comprises a first symbol sub-group and a second symbol sub-group.

In one embodiment, the first symbol sub-group belongs to the first symbol set.

In one embodiment, the first symbol set comprises the first symbol sub-group.

In one embodiment, the first symbol sub-group is one of the Q first-type symbol groups comprised by the first symbol set.

In one embodiment, the first symbol sub-group comprises a positive integer number of first-type multicarrier symbol(s), wherein each of the positive integer number of first-type multicarrier symbol(s) comprised by the first symbol sub-group belongs to the second symbol group, and each of the positive integer number of first-type multicarrier symbol(s) comprised by the first symbol sub-group belongs to the first symbol set.

In one embodiment, any of the positive integer number of first-type multicarrier symbol(s) belongs to the second symbol group and the first symbol set simultaneously.

In one embodiment, the second symbol sub-group comprises a positive integer number of second-type multicarrier symbol(s), wherein each of the positive integer number of second-type multicarrier symbol(s) comprised by the second symbol sub-group belongs to the second symbol group, and each of the positive integer number of second-type multicarrier symbol(s) comprised by the second symbol sub-group does not belong to the first symbol set.

In one embodiment, any of the positive integer number of second-type multicarrier symbol(s) belongs to the second symbol group and does not belong to the first symbol set.

In one embodiment, any of the positive integer number of multicarrier symbols comprised by the second symbol group that belongs to the first symbol set is one of the positive integer number of first-type multicarrier symbol(s) comprised by the first symbol sub-group.

In one embodiment, any of the positive integer number of multicarrier symbols comprised by the second symbol group that does not belong to the first symbol set is one of the positive integer number of second-type multicarrier symbol(s) comprised by the second symbol sub-group.

In one embodiment, the first symbol sub-group comprises each of the positive integer number of multicarrier symbols comprised by the second symbol group that belongs to the first symbol set.

In one embodiment, the second symbol sub-group comprises each of the positive integer number of multicarrier symbols comprised by the second symbol group that does not belong to the first symbol set.

In one embodiment, any of the positive integer number of first-type multicarrier symbol(s) comprised by the first symbol sub-group belongs to the first symbol set.

In one embodiment, any of the positive integer number of second-type multicarrier symbol(s) comprised by the second symbol sub-group does not belong to the first symbol set.

In one embodiment, any of the positive integer number of second-type multicarrier symbol(s) is a UL symbol.

In one embodiment, any of the positive integer number of second-type multicarrier symbol(s) is a Flexible symbol.

In one embodiment, any of the positive integer number of second-type multicarrier symbol(s) is either a UL symbol or a Flexible symbol.

In one embodiment, any of the positive integer number of second-type multicarrier symbol(s) is a DL symbol.

In one embodiment, any of the positive integer number of second-type multicarrier symbol(s) is reserved for UL transmissions.

In one embodiment, the positive integer number of second-type multicarrier symbol(s) can be reserved for UL transmissions or DL transmissions.

In one embodiment, any of the positive integer number of second-type multicarrier symbol(s) is reserved for DL transmissions.

In one embodiment, any of the positive integer number of second-type multicarrier symbol(s) is reserved for UL transmissions within a given frequency band.

In one embodiment, any of the positive integer number of second-type multicarrier symbol(s) can be reserved for UL transmissions or for DL transmissions within a given frequency band.

In one embodiment, any of the positive integer number of second-type multicarrier symbol(s) is reserved for DL transmissions within a given frequency band.

In one embodiment, any of the positive integer number of second-type multicarrier symbol(s) is reserved for UL transmissions within (a) given positive integer number of subcarrier(s) in frequency domain.

In one embodiment, any of the positive integer number of second-type multicarrier symbol(s) can be reserved for UL transmissions or for DL transmissions within (a) given positive integer number of subcarrier(s) in frequency domain.

In one embodiment, any of the positive integer number of second-type multicarrier symbol(s) is reserved for DL transmissions within (a) given positive integer number of subcarrier(s) in frequency domain.

In one embodiment, the positive integer number of first-type multicarrier symbol(s) comprised by the first symbol sub-group is(are) reserved for SL transmissions.

In one embodiment, the positive integer number of second-type multicarrier symbol(s) comprised by the second symbol sub-group is(are) reserved for SL transmissions.

In one embodiment, the positive integer number of first-type multicarrier symbol(s) comprised by the first symbol sub-group is(are) reserved for SL transmissions within a given frequency band.

In one embodiment, the positive integer number of second-type multicarrier symbol(s) comprised by the second symbol sub-group is(are) reserved for SL transmissions within a given frequency band.

In one embodiment, the positive integer number of first-type multicarrier symbol(s) comprised by the first symbol sub-group is(are) reserved for SL transmissions within (a) given positive integer number of subcarrier(s) in frequency domain.

In one embodiment, the positive integer number of second-type multicarrier symbol(s) comprised by the second symbol sub-group is(are) reserved for SL transmissions within (a) given positive integer number of subcarrier(s) in frequency domain.

In one embodiment, the first symbol sub-group comprises the first symbol group.

In one embodiment, each of the positive integer number of multicarrier symbol(s) comprised by the first symbol group belongs to the first symbol sub-group.

In one embodiment, any multicarrier symbol in the first symbol group is a first-type multicarrier symbol in the first symbol sub-group.

In one embodiment, the first symbol group is the same as the first symbol sub-group.

In one embodiment, the positive integer number of multicarrier symbol(s) comprised by the first symbol group respectively corresponds (correspond) to the positive integer number of first-type multicarrier symbol(s) comprised by the first symbol sub-group.

In one subembodiment, the multicarrier symbol(s) comprised by the first symbol group is(are) the same as first-type multicarrier symbol(s) comprised by the first symbol sub-group respectively.

In one embodiment, the first symbol sub-group is semi-static.

In one embodiment, the second symbol sub-group is dynamic.

In one embodiment, the first symbol sub-group is configured by a higher-layer signaling.

In one embodiment, the second symbol sub-group is indicated by a physical layer signaling.

In one embodiment, the first symbol sub-group is configured by an RRC signaling.

In one embodiment, the first symbol sub-group is configured by an RRC IE.

In one embodiment, the first symbol sub-group is configured by a SIB.

In one embodiment, the second symbol sub-group is indicated by DCI.

In one embodiment, the second symbol sub-group is indicated by SCI.

In one embodiment, the first symbol sub-group is pre-defined.

In one embodiment, the first symbol sub-group is pre-configured.

In one embodiment, the second symbol sub-group is variable.

In one embodiment, the positive integer number of first-type multicarrier symbol(s) comprised by the first symbol sub-group is(are) semi-static.

In one embodiment, the positive integer number of second-type multicarrier symbol(s) comprised by the second symbol sub-group is(are) dynamic.

In one embodiment, the positive integer number of first-type multicarrier symbol(s) comprised by the first symbol sub-group is(are) configured by a higher-layer signaling.

In one embodiment, the positive integer number of second-type multicarrier symbol(s) comprised by the second symbol sub-group is(are) indicated by a physical layer signaling.

In one embodiment, the positive integer number of first-type multicarrier symbol(s) comprised by the first symbol sub-group is(are) pre-defined.

In one embodiment, the positive integer number of first-type multicarrier symbol(s) comprised by the first symbol sub-group is(are) pre-configured.

In one embodiment, the positive integer number of second-type multicarrier symbol(s) comprised by the second symbol sub-group is(are) variable.

In one embodiment, the first symbol sub-group comprises a PSCCH.

In one embodiment, the first symbol sub-group comprises a PSCCH and a PSSCH.

In one embodiment, the second symbol sub-group comprises a PSSCH.

In one embodiment, the second symbol sub-group comprises only a PSSCH.

In one embodiment, the first symbol sub-group comprises a PSFCH.

In one embodiment, the first symbol sub-group comprises a PSFCH and a PSSCH.

In one embodiment, the first symbol sub-group comprises a PSFCH and a PSCCH.

In one embodiment, the first symbol sub-group comprises a PSFCH, a PSCCH and a PSCCH.

In one embodiment, the first symbol sub-group comprises a PUCCH.

In one embodiment, the first symbol sub-group comprises a PUSCH.

In one embodiment, the first symbol sub-group comprises a PUCCH and a PUSCH.

In one embodiment, the second symbol sub-group comprises a PUSCH.

In one embodiment, the second symbol sub-group comprises only a PUSCH.

In one embodiment, at least one of the positive integer number of first-type multicarrier symbols comprised by the first symbol sub-group is used for transmitting SCI, and at least one of the positive integer number of first-type multicarrier symbols comprised by the first symbol sub-group is used for transmitting an SL-SCH.

In one embodiment, at least one of the positive integer number of second-type multicarrier symbol(s) comprised by the second symbol sub-group is used for transmitting an SL-SCH.

In one embodiment, each of the positive integer number of second-type multicarrier symbol(s) comprised by the second symbol sub-group is used for transmitting an SL-SCH.

In one embodiment, at least one of the positive integer number of second-type multicarrier symbol(s) comprised by the second symbol sub-group is used for transmitting SL data.

In one embodiment, each of the positive integer number of second-type multicarrier symbol(s) comprised by the second symbol sub-group is used for transmitting SL data.

In one embodiment, at least one of the positive integer number of first-type multicarrier symbols comprised by the first symbol sub-group comprises a PSCCH, and at least one of the positive integer number of first-type multicarrier symbols comprised by the first symbol sub-group comprises a PSSCH.

In one embodiment, at least one of the positive integer number of first-type multicarrier symbols comprised by the first symbol sub-group comprises both a PSCCH and a PSSCH.

In one embodiment, at least one of the positive integer number of first-type multicarrier symbols comprised by the first symbol sub-group belongs to a PSCCH, and at least one of the positive integer number of first-type multicarrier symbols comprised by the first symbol sub-group belongs to a PSSCH.

In one embodiment, at least one of the positive integer number of first-type multicarrier symbols comprised by the first symbol sub-group is used for transmitting SFI.

In one embodiment, at least one of the positive integer number of first-type multicarrier symbols comprised by the first symbol sub-group comprises a PSFCH.

In one embodiment, at least one of the positive integer number of first-type multicarrier symbols comprised by the first symbol sub-group comprises a PSFCH, and at least one of the positive integer number of first-type multicarrier symbols comprised by the first symbol sub-group comprises a PSSCH.

In one embodiment, at least one of the positive integer number of first-type multicarrier symbols comprised by the first symbol sub-group belongs to a PSFCH.

In one embodiment, at least one of the positive integer number of first-type multicarrier symbols comprised by the first symbol sub-group belongs to a PSFCH, and at least one of the positive integer number of first-type multicarrier symbols comprised by the first symbol sub-group belongs to a PSSCH.

In one embodiment, the positive integer number of first-type multicarrier symbols comprised by the first symbol sub-group are consecutive in time domain.

In one embodiment, the positive integer number of first-type multicarrier symbols comprised by the first symbol sub-group are non-consecutive in time domain.

In one embodiment, the positive integer number of second-type multicarrier symbols comprised by the second symbol sub-group are consecutive in time domain.

In one embodiment, the positive integer number of second-type multicarrier symbols comprised by the second symbol sub-group are non-consecutive in time domain.

In one embodiment, the positive integer number of first-type multicarrier symbols comprised by the first symbol sub-group are consecutive in time domain, and the positive integer number of second-type multicarrier symbols comprised by the second symbol sub-group are consecutive in time domain.

In one embodiment, the positive integer number of first-type multicarrier symbols comprised by the first symbol sub-group are consecutive in time domain, while the positive integer number of second-type multicarrier symbols comprised by the second symbol sub-group are non-consecutive in time domain.

In one embodiment, the first symbol sub-group is earlier than the second symbol sub-group in time domain.

In one embodiment, the first symbol sub-group is later than the second symbol sub-group in time domain.

In one embodiment, the first symbol sub-group is located within the second symbol sub-group in time domain.

In one embodiment, at least one first-type multicarrier symbol in the first symbol sub-group is earlier than at least one second-type multicarrier symbol in the second symbol sub-group in time domain.

In one embodiment, at least one first-type multicarrier symbol in the first symbol sub-group is earlier than each second-type multicarrier symbol comprised in the second symbol sub-group in time domain.

In one embodiment, each first-type multicarrier symbol comprised in the first symbol sub-group is earlier than each second-type multicarrier symbol comprised in the second symbol sub-group in time domain.

In one embodiment, at least one first-type multicarrier symbol in the first symbol sub-group is later than at least one second-type multicarrier symbol in the second symbol sub-group in time domain.

In one embodiment, at least one first-type multicarrier symbol in the first symbol sub-group is later than each second-type multicarrier symbol comprised in the second symbol sub-group in time domain.

In one embodiment, each first-type multicarrier symbol comprised in the first symbol sub-group is later than each second-type multicarrier symbol comprised in the second symbol sub-group in time domain.

In one embodiment, at least one second-type multicarrier symbol in the second symbol sub-group is earlier than each first-type multicarrier symbol comprised in the first symbol sub-group, and at least one second-type multicarrier symbol in the second symbol sub-group is later than each first-type multicarrier symbol comprised in the first symbol sub-group.

In one embodiment, at least one second-type multicarrier symbol in the second symbol sub-group is in front of the first symbol sub-group.

In one subembodiment, at least one second-type multicarrier symbol in the second symbol sub-group is behind the first symbol sub-group.

In one embodiment, any second-type multicarrier symbol in the second symbol sub-group is in front of the first symbol sub-group.

In one embodiment, the first symbol sub-group and the second symbol sub-group are adjacent.

In one embodiment, the first symbol sub-group and the second symbol sub-group are not adjacent.

In one embodiment, there isn't any multicarrier symbol located between the first symbol sub-group and the second symbol sub-group.

In one embodiment, there is at least one multicarrier symbol located between the first symbol sub-group and the second symbol sub-group.

Embodiment 9

Figure 9:
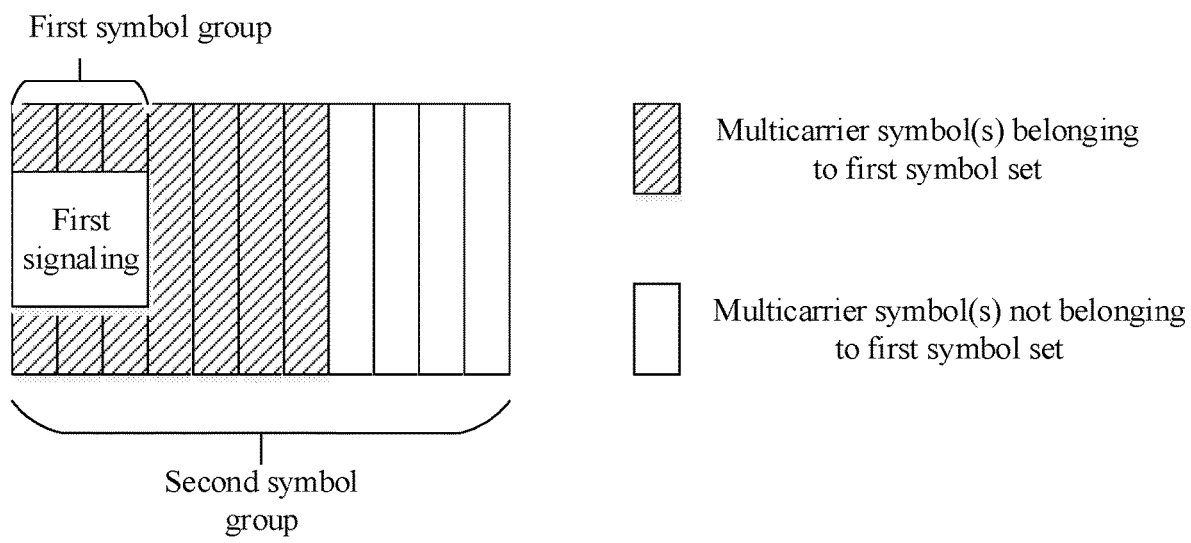
FIG. 9 illustrates a schematic diagram of relations among a first symbol group, a second symbol group and a first signaling according to one embodiment of the present disclosure.

Embodiment 9 illustrates a schematic diagram of relations among a first symbol group, a second symbol group and a first signaling according to one embodiment of the present disclosure, as shown in FIG. 9. In FIG. 9, each rectangle filled with slashes represents a multicarrier symbol belonging to a first symbol set in the present disclosure; each blank rectangle represents a multicarrier symbol not belonging to the first symbol set in the present disclosure; and the blank square represents a first signaling in the present disclosure.

In Embodiment 9, the first signaling indicates the second symbol group, the second symbol group comprises the first symbol group, and the first signaling is transmitted in the first symbol group.

In one embodiment, the first signaling explicitly indicates the second symbol group.

In one embodiment, the first signaling implicitly indicates the second symbol group.

In one embodiment, the first signaling is used for indicating the second symbol group from the second symbol set.

In one embodiment, the first signaling comprises an index of the second symbol group among the Q1 first-type symbol groups comprised by the second symbol set.

In one embodiment, the first signaling indicates a time interval between the second symbol group and an earliest first-type symbol group comprised by the second symbol set.

In one embodiment, the first signaling indicates the positive integer number of multicarrier symbols comprised by the second symbol group.

In one embodiment, the first signaling indicates an earliest multicarrier symbol among the positive integer number of multicarrier symbols comprised by the second symbol group.

In one embodiment, the first signaling indicates a latest multicarrier symbol among the positive integer number of multicarrier symbols comprised by the second symbol group.

In one embodiment, the first signaling indicates a quantity of the positive integer number of multicarrier symbols comprised by the second symbol group.

In one embodiment, the first signaling indicates a start time of the second symbol group in time domain.

In one embodiment, the first signaling indicates an end time of the second symbol group in time domain.

In one embodiment, the first signaling indicates a time length comprised by the second symbol group in time domain.

In one embodiment, the first signaling indicates a time duration of the second symbol group.

In one embodiment, the first signaling indicates time-domain resource unit(s) occupied by the second symbol group in time domain.

In one embodiment, the first signaling indicates a number of time-domain resource unit(s) occupied by the second symbol group in time domain.

In one embodiment, the first signaling indicates the first symbol sub-group and the second symbol sub-group respectively.

In one embodiment, the first signaling indicates a time interval between the first symbol sub-group and the second symbol sub-group.

In one embodiment, a time interval between the first symbol sub-group and the second symbol sub-group comprises a positive integer number of time-domain resource unit(s).

In one embodiment, a time interval between the first symbol sub-group and the second symbol sub-group comprises a positive integer number of multicarrier symbol(s).

In one embodiment, the first signaling respectively indicates a start time of the first symbol sub-group and a start time of the second symbol sub-group.

In one embodiment, the first signaling respectively indicates time-domain resource unit(s) comprised by the first symbol sub-group in time domain and time-domain resource unit(s) comprised by the second symbol sub-group in time domain.

In one embodiment, the first signaling respectively indicates an earliest first-type multicarrier symbol in the first symbol sub-group and an earliest second-type multicarrier symbol in the second symbol sub-group.

In one embodiment, the first signaling respectively indicates an earliest first-type multicarrier symbol in the first symbol sub-group and a latest second-type multicarrier symbol in the second symbol sub-group.

In one embodiment, the first signaling indicates frequency-domain resource unit(s) occupied by the first radio signal in the second symbol group.

In one embodiment, the first signaling indicates a number of frequency-domain resource unit(s) occupied by the first radio signal in the second symbol group.

In one embodiment, the first signaling indicates a lowest frequency-domain resource unit occupied by the first radio signal in the second symbol group.

In one embodiment, the first signaling indicates subchannel(s) occupied by the first radio signal in the second symbol group.

In one embodiment, the first signaling indicates Physical Resource Block(s) (PRB) occupied by the first radio signal in the second symbol group.

In one embodiment, the first signaling indicates subcarrier(s) occupied by the first radio signal in the second symbol group.

In one embodiment, an earliest multicarrier symbol among a positive integer number of multicarrier symbols occupied by the first signaling is used for determining an earliest multicarrier symbol among a positive integer number of multicarrier symbols comprised by the second symbol group.

In one embodiment, an earliest multicarrier symbol among a positive integer number of multicarrier symbols occupied by the first signaling is the same as an earliest multicarrier symbol among a positive integer number of multicarrier symbols comprised by the second symbol group.

In one embodiment, a scrambling sequence of the first signaling is used for determining the second symbol group.

In one embodiment, a DMRS of the first signaling is used for determining the second symbol group.

In one embodiment, the first symbol group is used for determining the second symbol group.

In one embodiment, an earliest multicarrier symbol among the positive integer number of multicarrier symbols comprised by the first symbol group is the same as an earliest multicarrier symbol among the positive integer number of multicarrier symbols comprised by the second symbol group.

In one embodiment, a latest multicarrier symbol among the positive integer number of multicarrier symbols comprised by the first symbol group is the same as a latest multicarrier symbol among the positive integer number of multicarrier symbols comprised by the second symbol group.

Embodiment 10

Figure 10:
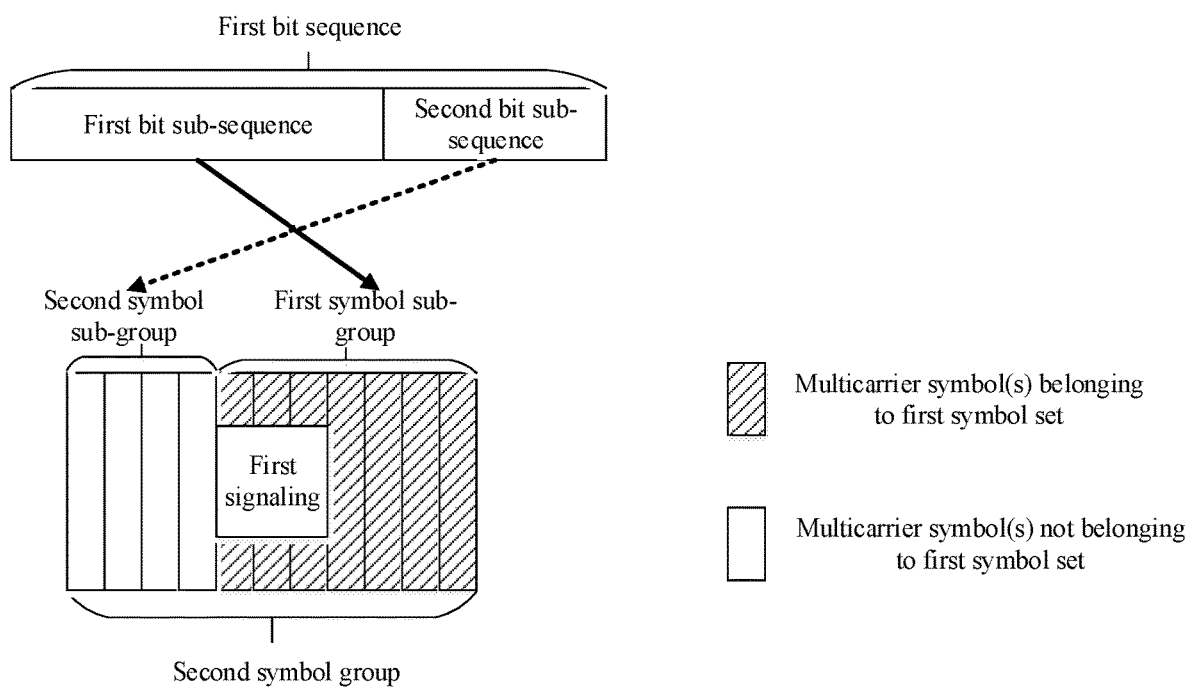
FIG. 10 illustrates a schematic diagram of relations among a first bit sequence, a first bit sub-sequence and a second bit sub-sequence, a first symbol sub-group, and a second symbol sub-group according to one embodiment of the present disclosure.

Embodiment 10 illustrates a schematic diagram of relations among a first bit sequence, a first bit sub-sequence and a second bit sub-sequence, a first symbol sub-group, and a second symbol sub-group according to one embodiment of the present disclosure, as shown in FIG. 10. In FIG. 10, each rectangle filled with slashes represents a multicarrier symbol belonging to a first symbol set in the present disclosure; and each blank rectangle represents a multicarrier symbol not belonging to the first symbol set in the present disclosure.

In Embodiment 10, a first bit sequence in the present disclosure comprises a first bit sub-sequence and a second bit sub-sequence, and an order of the first bit sub-sequence in the first bit sequence is prior to that of the second bit sub-sequence in the first bit sequence; the first bit sub-sequence is mapped onto multicarrier symbol(s) in the second symbol group belonging to the first symbol set, while the second bit sub-sequence is mapped onto multicarrier symbol(s) in the second symbol group not belonging to the first symbol set.

In one embodiment, the first bit sequence comprises the first bit sub-sequence and the second bit sub-sequence.

In one embodiment, the first bit sub-sequence comprises a positive integer number of sequentially arranged bits.

In one embodiment, the second bit sub-sequence comprises a positive integer number of sequentially arranged bits.

In one embodiment, the first bit sub-sequence and the second bit sub-sequence are respectively two first-type bit sequences among the positive integer number of first-type bit sequences comprised by the first bit sequence.

In one embodiment, the first bit sub-sequence is different from the second bit sub-sequence.

In one embodiment, the first bit sub-sequence is overlapped with the second bit sub-sequence.

In one embodiment, any bit in the first bit sub-sequence is different from any bit in the second bit sub-sequence.

In one embodiment, at least one bit in the first bit sub-sequence is the same as a bit in the second bit sub-sequence.

In one embodiment, an order of the first bit sub-sequence in the first bit sequence is prior to that of the second bit sub-sequence in the first bit sequence.

In one embodiment, an order of a last bit comprised by the first bit sub-sequence in the first bit sequence is prior to an order of a first bit comprised by the second bit sub-sequence in the first bit sequence.

In one embodiment, an order of at least one bit comprised by the first bit sub-sequence in the first bit sequence is prior to an order of each bit comprised by the second bit sub-sequence in the first bit sequence.

In one embodiment, the first bit sub-sequence is mapped onto the positive integer number of first-type multicarrier symbol(s) comprised by the first symbol sub-group.

In one embodiment, the second bit sub-sequence is mapped onto the positive integer number of second-type multicarrier symbol(s) comprised by the second symbol sub-group.

In one embodiment, an output by the first bit sub-sequence through modulation is mapped onto the positive integer number of first-type multicarrier symbol(s) comprised by the first symbol sub-group.

In one embodiment, an output by the second bit sub-sequence through modulation is mapped onto the positive integer number of second-type multicarrier symbol(s) comprised by the second symbol sub-group.

In one embodiment, an output by the first bit sub-sequence through modulation and scrambling is mapped onto the positive integer number of first-type multicarrier symbol(s) comprised by the first symbol sub-group.

In one embodiment, an output by the second bit sub-sequence through modulation and scrambling is mapped onto the positive integer number of second-type multicarrier symbol(s) comprised by the second symbol sub-group.

In one embodiment, the first bit sub-sequence is sequentially mapped onto the positive integer number of first-type multicarrier symbols comprised by the first symbol sub-group in a chronological order.

In one embodiment, the second bit sub-sequence is reversely mapped onto the positive integer number of second-type multicarrier symbols comprised by the second symbol sub-group in a chronological order.

In one embodiment, a first multicarrier symbol and a second multicarrier symbol are respectively two first-type multicarrier symbols in the first symbol sub-group, and the first multicarrier symbol is earlier than the second multicarrier symbol in time domain.

In one embodiment, the first bit sub-sequence comprises a first candidate bit and a second candidate bit, an order of the first candidate bit in the first bit sub-sequence being prior to an order of the second candidate bit in the first bit sub-sequence.

In one embodiment, the first candidate bit is mapped onto the first multicarrier symbol, while the second candidate bit is mapped onto the second multicarrier symbol.

In one embodiment, a third multicarrier symbol and a fourth multicarrier symbol are respectively two second-type multicarrier symbols in the second symbol sub-group, the third multicarrier symbol being earlier than the fourth multicarrier symbol in time domain.

In one embodiment, the second bit sub-sequence comprises a third candidate bit and a fourth candidate bit, an order of the third candidate bit in the second bit sub-sequence being prior to an order of the fourth candidate bit in the second bit sub-sequence.

In one embodiment, the third candidate bit is mapped onto the fourth multicarrier symbol, while the fourth candidate bit is mapped onto the third multicarrier symbol.

In one embodiment, the third candidate bit is mapped onto the third multicarrier symbol, while the fourth candidate bit is mapped onto the fourth multicarrier symbol.

Embodiment 11

Figure 11:
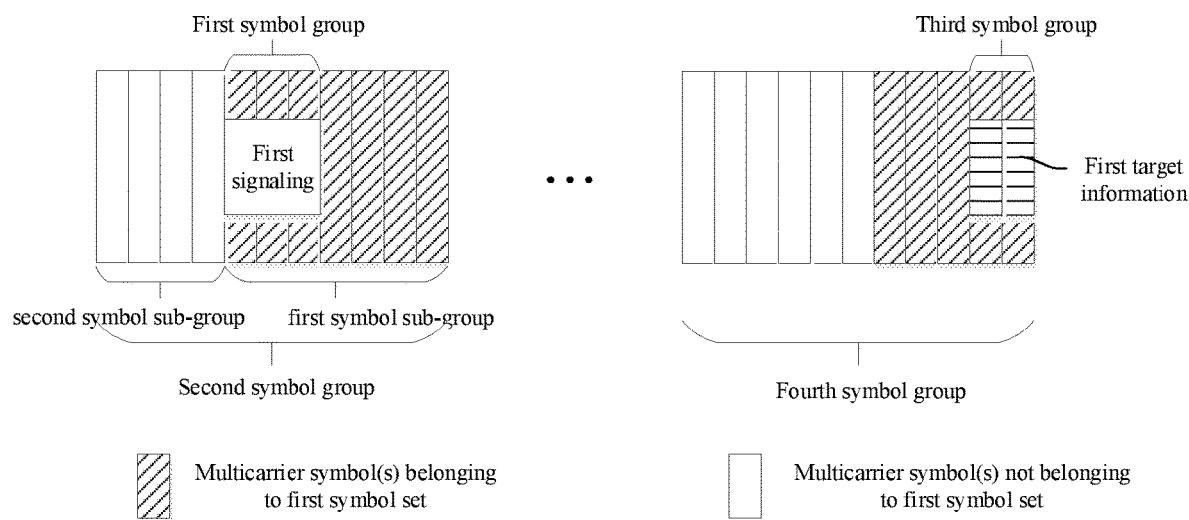
FIG. 11 illustrates a schematic diagram of relations among a first symbol sub-group, a second symbol sub-group, a first symbol group, a third symbol group and first target information according to one embodiment of the present disclosure.

Embodiment 11 illustrates a schematic diagram of relations among a first symbol sub-group, a second symbol sub-group, a first symbol group, a third symbol group and first target information according to one embodiment of the present disclosure, as shown in FIG. 11. In FIG. 11, each rectangle filled with slashes represents a multicarrier symbol belonging to a first symbol set in the present disclosure; and each blank rectangle represents a multicarrier symbol not belonging to the first symbol set in the present disclosure; the blank square represents a first signaling in the present disclosure; and the box filled with horizontal lines represents first target information in the present disclosure.

In Embodiment 11, the first target information in the present disclosure indicates whether the first radio signal is correctly decoded; the third symbol group is unrelated to a number of and respective position(s) of multicarrier symbol(s) comprised by a second symbol sub-group.

In one embodiment, the first target information is transmitted through a PSFCH.

In one embodiment, the first target information is transmitted through a PSCCH.

In one embodiment, the first target information is transmitted through a PSSCH.

In one embodiment, the first target information is transmitted through a PSCCH and a PSSCH.

In one embodiment, the first target information is transmitted through a PUCCH.

In one embodiment, the first target information is transmitted through a PUSCH.

In one embodiment, the first target information is transmitted through a PUCCH and a PUSCH.

In one embodiment, the first target information is transmitted through a PDCCH.

In one embodiment, the first target information is transmitted through a PDSCH.

In one embodiment, the first target information is transmitted through a PDCCH and a PDSCH.

In one embodiment, the first target information is transmitted via broadcast.

In one embodiment, the first target information is transmitted via groupcast.

In one embodiment, the first target information is transmitted via unicast.

In one embodiment, the first target information is cell-specific.

In one embodiment, the first target information is UE-specific.

In one embodiment, the first target information comprises SFI.

In one embodiment, the first target information comprises HARQ information.

In one embodiment, the first target information comprises SL HARQ information.

In one embodiment, the first target information comprises HARQ-ACK.

In one embodiment, the first target information comprises SL HARQ-ACK.

In one embodiment, the first target information comprises HARQ-NACK.

In one embodiment, the first target information comprises SL HARQ-NACK.

In one embodiment, the first target information comprises either HARQ-ACK or HARQ-NACK.

In one embodiment, the first target information comprises either SL HARQ-ACK or SL HARQ-NACK.

In one embodiment, the first target information is used for indicating whether the first radio signal is correctly decoded.

In one embodiment, the first target information is used for indicating that the first radio signal is correctly decoded.

In one embodiment, the first target information is used for indicating that the first radio signal is not correctly decoded.

In one embodiment, the first target information is used for indicating whether the first bit sequence is correctly decoded.

In one embodiment, the first target information is used for indicating whether the first bit sub-sequence is correctly decoded.

In one embodiment, the first target information is used for indicating whether the second bit sub-sequence is correctly decoded.

In one embodiment, the first target information is used for indicating that the first bit sequence is correctly decoded.

In one embodiment, the first target information is used for indicating that the first bit sub-sequence is correctly decoded.

In one embodiment, the first target information is used for indicating that the second bit sub-sequence is correctly decoded.

In one embodiment, the first target information is used for indicating that the first bit sequence is not correctly decoded.

In one embodiment, the first target information is used for indicating that the first bit sub-sequence is not correctly decoded.

In one embodiment, the first target information is used for indicating that the second bit sub-sequence is not correctly decoded.

In one embodiment, the first target information comprises a second sequence.

In one embodiment, the second sequence is generated by a pseudo-random sequence.

In one embodiment, the second sequence is generated by a Gold sequence.

In one embodiment, the second sequence is generated by a M-sequence.

In one embodiment, the second sequence is generated by a Zadeoff-Chu sequence.

In one embodiment, for the generation mode of the second sequence, refer to 3GPP TS38.211, section 7.4.1.5.

In one embodiment, whether the first bit sequence is correctly decoded is used for determining an initial sequence of the second sequence.

In one embodiment, an initial sequence of the second sequence is a first initial sequence, which indicates that the first bit sequence is correctly decoded.

In one embodiment, an initial sequence of the second sequence is a second initial sequence, which indicates that the first bit sequence is not correctly decoded.

In one embodiment, whether the first bit sequence is correctly decoded is used for determining a cyclic shift of the second sequence.

In one embodiment, a cyclic shift of the second sequence relative to a base sequence is a first cyclic shift, which indicates that the first bit sequence is correctly decoded.

In one embodiment, a cyclic shift of the second sequence relative to a base sequence is a second cyclic shift, which indicates that the first bit sequence is not correctly decoded.

In one embodiment, whether the first bit sequence is correctly decoded is used for determining scrambling of the second sequence.

In one embodiment, a sequence for scrambling the second sequence is a first scrambling sequence, which indicates that the first bit sequence is correctly decoded.

In one embodiment, a sequence for scrambling the second sequence is a second scrambling sequence, which indicates that the first bit sequence is not correctly decoded.

In one embodiment, only when the first bit sequence is correctly decoded is the first target signal transmitted.

In one embodiment, only when the first bit sequence is not correctly decoded is the first target signal transmitted.

In one embodiment, when the first bit sequence is correctly decoded, a transmission of the first target signal is dropped; when the first bit sequence is not correctly decoded, the first target signal is transmitted.

In one embodiment, when the first bit sequence is correctly decoded, the first target signal is transmitted; when the first bit sequence is not correctly decoded, a transmission of the first target signal is dropped.

In one embodiment, the first target signal comprises a positive integer number of information bit(s), and the positive integer number of information bit(s) comprised in the first target signal is(are) respectively used for indicating whether the positive integer number of first-type bit sequence(s) in the first bit sequence is(are) correctly decoded.

In one embodiment, the first target signal comprises a positive integer number of information bit(s), and the positive integer number of information bit(s) comprised in the first target signal is(are) respectively used for indicating that the positive integer number of first-type bit sequence(s) in the first bit sequence is(are) correctly decoded.

In one embodiment, the first target signal comprises a positive integer number of information bit(s), and the positive integer number of information bit(s) comprised in the first target signal is(are) respectively used for indicating that the positive integer number of first-type bit sequence(s) in the first bit sequence is(are) not correctly decoded.

In one embodiment, a first information bit is any information bit in the first target signal, a first target bit sequence is a first-type bit sequence in the first bit sequence, and the first information bit is used for indicating whether the first target bit sequence is correctly decoded.

In one embodiment, a first information bit is any information bit in the first target signal, a first target bit sequence is a first-type bit sequence in the first bit sequence, and the first information bit is used for indicating that the first target bit sequence is correctly decoded.

In one embodiment, a first information bit is any information bit in the first target signal, a first target bit sequence is a first-type bit sequence in the first bit sequence, and the first information bit is used for indicating that the first target bit sequence is not correctly decoded.

In one embodiment, the first target signal comprises a second information bit, and the second information bit is used for indicating whether each first-type bit sequence in the first bit sequence is correctly decoded.

In one embodiment, the first target signal comprises a second information bit, and the second information bit is used for indicating that each first-type bit sequence in the first bit sequence is correctly decoded.

In one embodiment, the first target signal comprises a second information bit, and the second information bit is used for indicating that each first-type bit sequence in the first bit sequence is not correctly decoded.

In one embodiment, the first target signal comprises a second information bit, and the second information bit is used for indicating whether at least one first-type bit sequence in the first bit sequence is correctly decoded.

In one embodiment, the first target signal comprises a second information bit, and the second information bit is used for indicating that at least one first-type bit sequence in the first bit sequence is correctly decoded.

In one embodiment, the first target signal comprises a second information bit, and the second information bit is used for indicating that at least one first-type bit sequence in the first bit sequence is not correctly decoded.

In one embodiment, the positive integer number of information bit(s) comprised in the first target signal respectively indicates (indicate) HARQ information.

In one embodiment, the positive integer number of information bit(s) comprised in the first target signal is(are) respectively binary bit(s).

In one embodiment, the first information bit indicates HARQ information.

In one embodiment, the first information bit indicates HARQ-NACK information.

In one embodiment, the second information bit indicates HARQ information.

In one embodiment, the second information bit indicates HARQ-NACK information.

In one embodiment, a value of the first information bit is 0.

In one embodiment, a value of the first information bit is 1.

In one embodiment, a value of the second information bit is 0.

In one embodiment, a value of the second information bit is 1.

In one embodiment, when the first bit sequence is correctly decoded, the first target signal is transmitted, the first target signal comprising the first information bit, and a value of the first information bit being 1.

In one embodiment, when the first bit sequence is not correctly decoded, the first target signal is transmitted, the first target signal comprising the first information bit, and a value of the first information bit being 0.

In one embodiment, when any first-type bit block in the first bit sequence is not correctly received, the first target signal is transmitted, the first target signal comprising the second sequence.

In one embodiment, when each first-type bit block in the first bit sequence is correctly received, the first target signal is transmitted, the first target signal comprising the second sequence.

In one embodiment, when at least one first-type bit sequence in the first bit sequence is not correctly received, a transmission of the first target signal is dropped.

In one embodiment, when each first-type bit sequence in the first bit sequence is correctly received, the first target signal is transmitted; when at least one first-type bit sequence in the first bit sequence is not correctly received, a transmission of the first target signal is dropped.

In one embodiment, when each first-type bit sequence in the first bit sequence is correctly received, a transmission of the first target signal is dropped; when at least one first-type bit sequence in the first bit sequence is not correctly received, the first target signal is transmitted.

In one embodiment, the first radio signal being correctly decoded comprises performing channel decoding on the first radio signal, and a result of performing the channel decoding on the first radio signal passes CRC check.

In one embodiment, the first radio signal being correctly decoded comprises performing energy detection on the first radio signal in a period, and an average value of a result of performing the energy detection on the first radio signal in the period exceeds a first given threshold.

In one embodiment, the first radio signal being correctly decoded comprises performing coherent detection on the first radio signal, and a signal energy obtained by performing the coherent detection on the first radio signal exceeds a second given threshold.

In one embodiment, the first bit sequence being correctly decoded comprises: a result of performing channel decoding on the first bit sequence passes CRC check.

In one embodiment, the first bit sequence being correctly decoded comprises: a result of performing receiving power detection on the first bit sequence is higher than a given receiving power threshold.

In one embodiment, the first bit sequence being correctly decoded comprises: an average value of results of performing multiple receiving power detections on the first bit sequence is higher than a given receiving power threshold.

In one embodiment, the third symbol group comprises a positive integer number of multicarrier symbol(s).

In one embodiment, the third symbol group comprises only one multicarrier symbol.

In one embodiment, the third symbol group comprises two multicarrier symbols.

In one embodiment, the first symbol set comprises the third symbol group.

In one embodiment, the third symbol group belongs to the first symbol set.

In one embodiment, any of the positive integer number of multicarrier symbol(s) comprised by the third symbol group belongs to the first symbol set.

In one embodiment, any of the positive integer number of multicarrier symbol(s) comprised by the third symbol group is one of the positive integer number of multicarrier symbol(s) comprised by the first symbol set.

In one embodiment, the third symbol group belongs to one of the Q first-type symbol groups comprised by the first symbol set.

In one embodiment, any of the positive integer number of multicarrier symbol(s) comprised by the third symbol group is one of the positive integer number of multicarrier symbol(s) comprised by one of the Q first-type symbol groups.

In one embodiment, the third symbol group is one of the Q first-type symbol groups comprised by the first symbol set.

In one embodiment, the positive integer number of multicarrier symbol(s) comprised by the third symbol group is(are) the same as the positive integer number of multicarrier symbol(s) comprised by one of the Q first-type symbol groups.

In one embodiment, the fourth symbol group comprises a positive integer number of multicarrier symbol(s).

In one embodiment, the first symbol set comprises at least one of the positive integer number of multicarrier symbol(s) comprised by the fourth symbol group.

In one embodiment, at least one of the positive integer number of multicarrier symbol(s) comprised by the fourth symbol group belongs to the positive integer number of multicarrier symbol(s) comprised by the first symbol set.

In one embodiment, at least one of the positive integer number of multicarrier symbol(s) comprised by the fourth symbol group does not belong to the positive integer number of multicarrier symbol(s) comprised by the first symbol set.

In one embodiment, at least one of the positive integer number of multicarrier symbol(s) comprised by the fourth symbol group is one of the positive integer number of multicarrier symbol(s) comprised by the first symbol set.

In one embodiment, at least one of the positive integer number of multicarrier symbol(s) comprised by the fourth symbol group is not any of the positive integer number of multicarrier symbol(s) comprised by the first symbol set.

In one embodiment, the fourth symbol group comprises the third symbol group.

In one embodiment, the third symbol group belongs to the fourth symbol group.

In one embodiment, each of the positive integer number of multicarrier symbol(s) comprised by the third symbol group belongs to the fourth symbol group.

In one embodiment, any multicarrier symbol in the third symbol group is a multicarrier symbol in the fourth symbol group.

In one embodiment, any multicarrier symbol in the third symbol group is a multicarrier symbol in the fourth symbol group not belonging to the first symbol set.

In one embodiment, the third symbol group is semi-statically configured.

In one embodiment, the third symbol group is pre-defined.

In one embodiment, the third symbol group is pre-configured.

In one embodiment, the third symbol group is fixed.

In one embodiment, the third symbol group is configured by a higher-layer signaling.

In one embodiment, the third symbol group is configured by an RRC signaling.

In one embodiment, the third symbol group is configured by an RRC IE.

In one embodiment, the third symbol group is configured by a SIB.

In one embodiment, the third symbol group comprises a PSFCH.

In one embodiment, the third symbol group comprises a PSCCH.

In one embodiment, the third symbol group comprises a PSSCH.

In one embodiment, the third symbol group comprises a PSCCH and a PSSCH.

In one embodiment, the third symbol group comprises a PSSCH and a PSFCH.

In one embodiment, the third symbol group comprises a PUCCH.

In one embodiment, the third symbol group comprises a PUSCH.

In one embodiment, the third symbol group comprises a PUCCH and a PUSCH.

In one embodiment, at least one of the positive integer number of multicarrier symbol(s) comprised by the third symbol group is used for transmitting SFI.

In one embodiment, any of the positive integer number of multicarrier symbol(s) comprised by the third symbol group is used for transmitting SFI.

In one embodiment, at least one of the positive integer number of multicarrier symbol(s) comprised by the third symbol group is used for transmitting Sidelink HARQ (SL-HARQ) information.

In one embodiment, any of the positive integer number of multicarrier symbol(s) comprised by the third symbol group is used for transmitting SL-HARQ information.

In one embodiment, at least one of the positive integer number of multicarrier symbol(s) comprised by the third symbol group comprises a PSFCH.

In one embodiment, any of the positive integer number of multicarrier symbol(s) comprised by the third symbol group comprises a PSFCH.

In one embodiment, at least one of the positive integer number of multicarrier symbol(s) comprised by the third symbol group belongs to a PSFCH.

In one embodiment, any of the positive integer number of multicarrier symbol(s) comprised by the third symbol group belongs to a PSFCH.

In one embodiment, at least one of the positive integer number of multicarrier symbol(s) comprised by the third symbol group is used for transmitting SCI.

In one embodiment, any of the positive integer number of multicarrier symbol(s) comprised by the third symbol group is used for transmitting SCI.

In one embodiment, at least one of the positive integer number of multicarrier symbol(s) comprised by the third symbol group comprises a PSCCH.

In one embodiment, any of the positive integer number of multicarrier symbol(s) comprised by the third symbol group comprises a PSCCH.

In one embodiment, at least one of the positive integer number of multicarrier symbol(s) comprised by the third symbol group belongs to a PSCCH.

In one embodiment, any of the positive integer number of multicarrier symbol(s) comprised by the third symbol group belongs to a PSCCH.

In one embodiment, at least one of the positive integer number of multicarrier symbol(s) comprised by the third symbol group is used for transmitting UCI.

In one embodiment, any of the positive integer number of multicarrier symbol(s) comprised by the third symbol group is used for transmitting UCI.

In one embodiment, at least one of the positive integer number of multicarrier symbol(s) comprised by the third symbol group is used for transmitting HARQ information.

In one embodiment, any of the positive integer number of multicarrier symbol(s) comprised by the third symbol group is used for transmitting HARQ information.

In one embodiment, at least one of the positive integer number of multicarrier symbol(s) comprised by the third symbol group comprises a PUCCH.

In one embodiment, any of the positive integer number of multicarrier symbol(s) comprised by the third symbol group comprises a PUCCH.

In one embodiment, at least one of the positive integer number of multicarrier symbol(s) comprised by the third symbol group belongs to a PUCCH.

In one embodiment, any of the positive integer number of multicarrier symbol(s) comprised by the third symbol group belongs to a PUCCH.

In one embodiment, the first symbol group is used for indicating the third symbol group.

In one embodiment, the first symbol group is used for determining the third symbol group.

In one embodiment, the first symbol group is used for determining a start time of the third symbol group.

In one embodiment, the first symbol group is used for determining an earliest multicarrier symbol in the third symbol group.

In one embodiment, the first symbol group is used for determining a latest multicarrier symbol in the third symbol group.

In one embodiment, the first symbol group is no later than the third symbol group.

In one embodiment, the first symbol group is earlier than the third symbol group.

In one embodiment, a latest multicarrier symbol in the first symbol group is no later than an earliest multicarrier symbol in the third symbol group.

In one embodiment, a latest multicarrier symbol in the first symbol group is no later than a latest multicarrier symbol in the third symbol group.

In one embodiment, the first symbol group and the third symbol group are spaced by a first time-domain offset in time domain.

In one embodiment, the first time-domain offset is a time interval between a latest multicarrier symbol in the first symbol group and an earliest multicarrier symbol in the third symbol group.

In one embodiment, the first time-domain offset is a time interval between a latest multicarrier symbol in the first symbol group and a latest multicarrier symbol in the third symbol group.

In one embodiment, the first time-domain offset is a time interval between an earliest multicarrier symbol in the first symbol group and an earliest multicarrier symbol in the third symbol group.

In one subembodiment, the first time-domain offset comprises a positive integer number of time-domain resource unit(s).

In one subembodiment, the first time-domain offset comprises a positive integer number of slot(s).

In one subembodiment, the first time-domain offset comprises a positive integer number of multicarrier symbol(s).

In one subembodiment, the first time-domain offset is pre-defined.

In one subembodiment, the first time-domain offset is pre-configured.

In one subembodiment, the first time-domain offset is fixed.

In one subembodiment, the first time-domain offset is configurable.

In one embodiment, the first symbol sub-group is used for indicating the third symbol group.

In one embodiment, the first symbol sub-group is used for determining the third symbol group.

In one embodiment, the first symbol sub-group is used for determining a start time of the third symbol group.

In one embodiment, the first symbol sub-group is used for determining an earliest multicarrier symbol in the third symbol group.

In one embodiment, the first symbol sub-group is used for determining a latest multicarrier symbol in the third symbol group.

In one embodiment, the first symbol sub-group is no later than the third symbol group.

In one embodiment, the first symbol sub-group is earlier than the third symbol group.

In one embodiment, a latest multicarrier symbol in the first symbol sub-group is no later than an earliest multicarrier symbol in the third symbol group.

In one embodiment, a latest multicarrier symbol in the first symbol sub-group is no later than a latest multicarrier symbol in the third symbol group.

In one embodiment, the first symbol sub-group and the third symbol group are spaced by a second time-domain offset in time domain.

In one embodiment, the second time-domain offset is a time interval between a latest multicarrier symbol in the first symbol sub-group and an earliest multicarrier symbol in the third symbol group.

In one embodiment, the second time-domain offset is a time interval between a latest multicarrier symbol in the first symbol sub-group and a latest multicarrier symbol in the third symbol group.

In one embodiment, the second time-domain offset is a time interval between an earliest multicarrier symbol in the first symbol sub-group and an earliest multicarrier symbol in the third symbol group.

In one subembodiment, the second time-domain offset comprises a positive integer number of time-domain resource unit(s).

In one subembodiment, the second time-domain offset comprises a positive integer number of slot(s).

In one subembodiment, the second time-domain offset comprises a positive integer number of multicarrier symbol(s).

In one subembodiment, the second time-domain offset is pre-defined.

In one subembodiment, the second time-domain offset is pre-configured.

In one subembodiment, the second time-domain offset is fixed.

In one subembodiment, the second time-domain offset is configurable.

In one embodiment, the first signaling explicitly indicates the third symbol group.

In one embodiment, the first signaling implicitly indicates the third symbol group.

In one embodiment, the first signaling comprises the first time-domain offset.

In one embodiment, the first signaling comprises the second time-domain offset.

In one embodiment, the first time-domain offset is a field among a positive integer number of field(s) comprised by the first signaling.

In one embodiment, the second time-domain offset is a field among a positive integer number of field(s) comprised by the first signaling.

In one embodiment, frequency-domain resource unit(s) occupied by the first signaling is(are) used for determining the first time-domain offset.

In one embodiment, frequency-domain resource unit(s) occupied by the first signaling is(are) used for determining the second time-domain offset.

In one embodiment, a DMRS employed by the first signaling is used for determining the first time-domain offset.

In one embodiment, a DMRS employed by the first signaling is used for determining the second time-domain offset.

In one embodiment, the third symbol group is unrelated to a number of and position(s) of multicarrier symbol(s) comprised by the second symbol sub-group.

In one embodiment, the third symbol group is unrelated to a number of second-type multicarrier symbol(s) comprised by the second symbol sub-group.

In one embodiment, the third symbol group is unrelated to a position of the second symbol sub-group in the second symbol group.

In one embodiment, the third symbol group is unrelated to position(s) of second-type multicarrier symbol(s) comprised by the second symbol sub-group among the second symbol group.

In one embodiment, a number of multicarrier symbol(s) comprised by the third symbol group is unrelated to the second symbol sub-group.

In one embodiment, a position of the third symbol group in the fourth symbol group is unrelated to the second symbol sub-group.

In one embodiment, a position of any multicarrier symbol comprised in the third symbol group in the fourth symbol group is unrelated to the second symbol sub-group.

In one embodiment, a position of any multicarrier symbol comprised in the third symbol group in the fourth symbol group is unrelated to a number of second-type multicarrier symbol(s) comprised by the second symbol sub-group.

In one embodiment, a position of any multicarrier symbol comprised in the third symbol group in the fourth symbol group is unrelated to a position of the second symbol sub-group in the second symbol group.

In one embodiment, when the second symbol sub-group comprises Y1 second-type multicarrier symbol(s), the third symbol group comprises Z1 multicarrier symbol(s); when the second symbol sub-group comprises Y2 second-type multicarrier symbol(s), the third symbol group comprises Z1 multicarrier symbol(s); Y1 and Y2 are non-negative integers unequal to each other, and Z1 is a positive integer.

In one embodiment, Y1 is equal to 0, and Y2 is greater than 0.

In one embodiment, when the second symbol sub-group comprises Y1 second-type multicarrier symbol(s), the third symbol group comprises only one multicarrier symbol, and the only multicarrier symbol comprised by the third symbol group is a latest multicarrier among the fourth symbol group; when the second symbol sub-group comprises Y2 second-type multicarrier symbol(s), the third symbol group comprises only one multicarrier symbol, and the only multicarrier symbol comprised by the third symbol group is a latest multicarrier among the fourth symbol group; Y1 and Y2 are non-negative integers unequal to each other.

In one embodiment, a number of multicarrier symbol(s) comprised by the third symbol group is unrelated to a positional relationship between the second symbol sub-group and the first symbol sub-group.

In one embodiment, when the first symbol sub-group is earlier than the second symbol sub-group in time domain, the third symbol group comprises Z1 multicarrier symbol(s); when the first symbol sub-group is later than the second symbol sub-group in time domain, the third symbol group comprises Z1 multicarrier symbol(s); when the first symbol sub-group is located within the second symbol sub-group in time domain, the third symbol group comprises Z1 multicarrier symbol(s).

In one embodiment, a position of any multicarrier symbol comprised in the third symbol group in the fourth symbol group is unrelated to a positional relationship between the second symbol sub-group and the first symbol sub-group.

In one embodiment, when the first symbol sub-group is earlier than the second symbol sub-group in time domain, a latest multicarrier symbol in the third symbol group is located in a latest multicarrier symbol in the fourth symbol group; when the first symbol sub-group is later than the second symbol sub-group in time domain, a latest multicarrier symbol in the third symbol group is located in a latest multicarrier symbol in the fourth symbol group; when the first symbol sub-group is located within the second symbol sub-group in time domain, a latest multicarrier symbol in the third symbol group is located in a latest multicarrier symbol in the fourth symbol group.

In one embodiment, when the first symbol sub-group is earlier than the second symbol sub-group in time domain, Z1 multicarrier symbol(s) comprised by the third symbol group is(are) latest Z1 multicarrier symbol(s) in the fourth symbol group; when the first symbol sub-group is later than the second symbol sub-group in time domain, Z1 multicarrier symbol(s) comprised by the third symbol group is(are) latest Z1 multicarrier symbol(s) in the fourth symbol group; when the first symbol sub-group is located within the second symbol sub-group in time domain, Z1 multicarrier symbol(s) comprised by the third symbol group is(are) latest Z1 multicarrier symbol(s) in the fourth symbol group.

Embodiment 12

Figure 12:
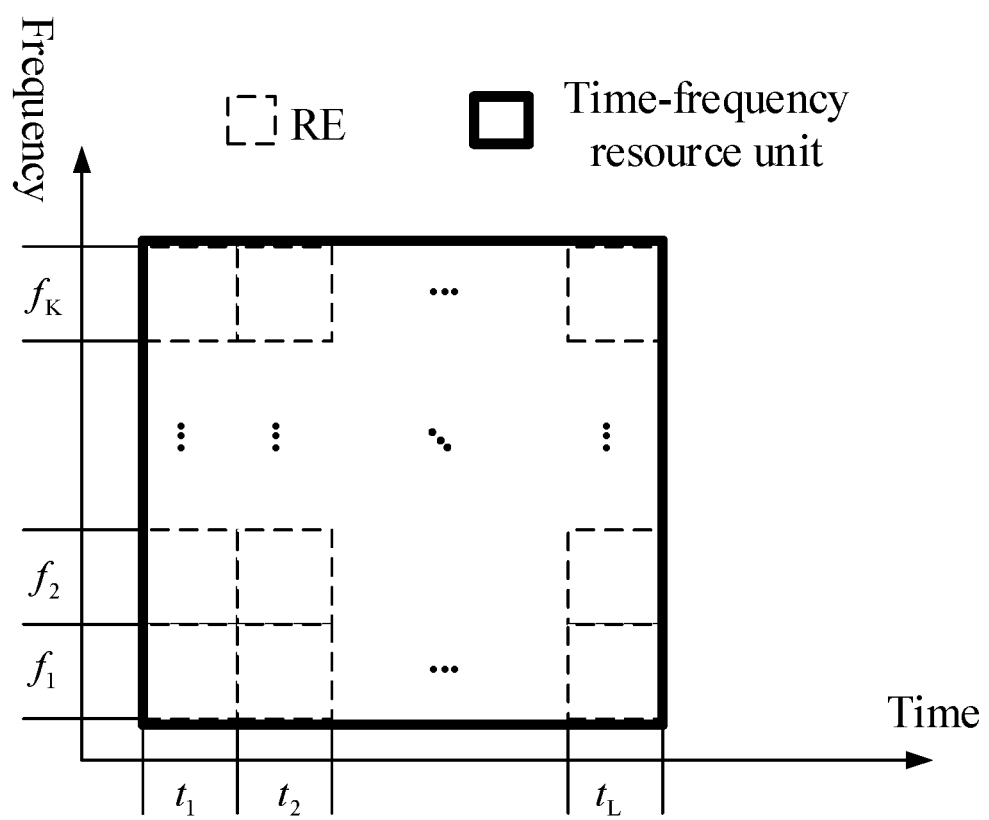
FIG. 12 illustrates a schematic diagram of a time-frequency resource unit according to one embodiment of the present disclosure.

Embodiment 12 illustrates a schematic diagram of a time-frequency resource unit according to one embodiment of the present disclosure, as shown in FIG. 12. In FIG. 12, each small box framed with broken lines represents a Resource Element (RE), and the large box framed with thick solid lines represents a time-frequency resource unit. In FIG. 12, a time-frequency resource unit occupies K subcarriers in frequency domain, and L multicarrier symbol(s) in time domain, K and L being positive integers. In FIG. 12, $t_1$, $t_2 \ldots$, and $t_L$ respectively represent the L symbol(s), while $f_1, f_2 \ldots$, and $f_K$ respectively represent the K subcarriers.

In Embodiment 12, a time-frequency resource unit occupies the K subcarriers in frequency domain and the L multicarrier symbol(s) in time domain, the K and the L being positive integers.

In one embodiment, the K is equal to 12.
In one embodiment, the K is equal to 72.
In one embodiment, the K is equal to 127.
In one embodiment, the K is equal to 240.
In one embodiment, the L is equal to 1.
In one embodiment, the L is equal to 2.
In one embodiment, the L is no greater than 14.
In one embodiment, any of the L multicarrier symbol(s) is an OFDM symbol.
In one embodiment, any of the L multicarrier symbol(s) is an SC-FDMA symbol.

In one embodiment, any of the L multicarrier symbol(s) is a DFT-S-OFDM symbol.
In one embodiment, any of the L multicarrier symbol(s) is a Frequency Division Multiple Access (FDMA) symbol.
In one embodiment, any of the L multicarrier symbol(s) is a Filter Bank Multi-Carrier (FBMC) symbol.
In one embodiment, any of the L multicarrier symbol(s) is an Interleaved Frequency Division Multiple Access (IFDMA) symbol.
In one embodiment, the time-domain resource unit comprises a positive integer number of Radio Frame(s).
In one embodiment, the time-domain resource unit comprises a positive integer number of Subframe(s).
In one embodiment, the time-domain resource unit comprises a positive integer number of Slot(s).
In one embodiment, the time-domain resource unit is a slot.
In one embodiment, the time-domain resource unit comprises a positive integer number of multicarrier symbol(s).
In one embodiment, the frequency-domain resource unit comprises a positive integer number of Carrier(s).
In one embodiment, the frequency-domain resource unit comprises a positive integer number of Bandwidth Part(s) (BWP).
In one embodiment, the frequency-domain resource unit is a BWP.
In one embodiment, the frequency-domain resource unit comprises a positive integer number of Subchannel(s).
In one embodiment, the frequency-domain resource unit is a Subchannel.
In one embodiment, any of the positive integer number of subchannel(s) comprises a positive integer number of Resource Block(s) (RB).
In one embodiment, the subchannel comprises a positive integer number of RB(s).
In one embodiment, any of the positive integer number of RB(s) comprises a positive integer number of subcarrier(s) in frequency domain.
In one embodiment, any of the positive integer number of RB(s) comprises 12 subcarriers in frequency domain.
In one embodiment, the subchannel comprises a positive integer number of PRB(s).
In one embodiment, a number of PRB(s) comprised by the subchannel is variable.
In one embodiment, any of the positive integer number of PRB(s) comprises a positive integer number of subcarrier(s) in frequency domain.
In one embodiment, any of the positive integer number of PRB(s) comprises 12 subcarriers in frequency domain.
In one embodiment, the frequency-domain resource unit comprises a positive integer number of RB(s).
In one embodiment, the frequency-domain resource unit is an RB.
In one embodiment, the frequency-domain resource unit comprises a positive integer number of PRB(s).
In one embodiment, the frequency-domain resource unit is a PRB.
In one embodiment, the frequency-domain resource unit comprises a positive integer number of subcarrier(s).
In one embodiment, the frequency-domain resource unit is a subcarrier.
In one embodiment, the time-frequency resource unit comprises the time-domain resource unit.
In one embodiment, the time-frequency resource unit comprises the frequency-domain resource unit.

In one embodiment, the time-frequency resource unit comprises the time-domain resource unit and the frequency-domain resource unit.

In one embodiment, the time-frequency resource unit comprises R RE(s), R being a positive integer.

In one embodiment, the time-frequency resource unit is composed of R RE(s), R being a positive integer.

In one embodiment, any of the R RE(s) occupies a multicarrier symbol in time domain and a subcarrier in frequency domain.

In one embodiment, a subcarrier spacing of the subcarrier is measured by Hertz (Hz).

In one embodiment, a subcarrier spacing of the subcarrier is measured by Kilohertz (kHz).

In one embodiment, a subcarrier spacing of the subcarrier is measured by Megahertz (MHz).

In one embodiment, a symbol length of the multicarrier symbol is measured by sampling points.

In one embodiment, a symbol length of the multicarrier symbol is measured by microsecond (μs).

In one embodiment, a symbol length of the multicarrier symbol is measured by millisecond (ms).

In one embodiment, a subcarrier spacing of the subcarrier is at least one of 1.25 kHz, 2.5 kHz, 5 kHz, 15 kHz, 30 kHz, 60 kHz, 120 kHz or 240 kHz.

In one embodiment, the time-frequency resource unit comprises the K subcarriers and the L multicarrier symbol(s), a product of the K and the L being no smaller than the R.

In one embodiment, the time-frequency resource unit does not comprise any RE allocated to a Guard Period (GP).

In one embodiment, the time-frequency resource unit does not comprise any RE allocated to a Reference Signal (RS).

In one embodiment, the time-frequency resource unit comprises a positive integer number of RB(s).

In one embodiment, the time-frequency resource unit belongs to an RB.

In one embodiment, the time-frequency resource unit is equal to an RB in frequency domain.

In one embodiment, the time-frequency resource unit comprises 6 RBs in frequency domain.

In one embodiment, the time-frequency resource unit comprises 20 RBs in frequency domain.

In one embodiment, the time-frequency resource unit comprises a positive integer number of PRB(s).

In one embodiment, the time-frequency resource unit belongs to a PRB.

In one embodiment, the time-frequency resource unit is equal to a PRB in frequency domain.

In one embodiment, the time-frequency resource unit comprises a positive integer number of Virtual Resource Block(s) (VRB).

In one embodiment, the time-frequency resource unit belongs to a VRB.

In one embodiment, the time-frequency resource unit is equal to a VRB in frequency domain.

In one embodiment, the time-frequency resource unit comprises a positive integer number of Physical Resource Block (PRB) pair(s).

In one embodiment, the time-frequency resource unit belongs to a PRB pair.

In one embodiment, the time-frequency resource unit is equal to a PRB pair in frequency domain.

In one embodiment, the time-frequency resource unit comprises a positive integer number of Radio Frame(s).

In one embodiment, the time-frequency resource unit belongs to a Radio Frame.

In one embodiment, the time-frequency resource unit is equal to a Radio Frame in time domain.

In one embodiment, the time-frequency resource unit comprises a positive integer number of subframe(s).

In one embodiment, the time-frequency resource unit belongs to a subframe.

In one embodiment, the time-frequency resource unit is equal to a subframe in time domain.

In one embodiment, the time-frequency resource unit comprises a positive integer number of slot(s).

In one embodiment, the time-frequency resource unit belongs to a slot.

In one embodiment, the time-frequency resource unit is equal to a slot in time domain.

In one embodiment, the time-frequency resource unit comprises a positive integer number of symbol(s).

In one embodiment, the time-frequency resource unit belongs to a symbol.

In one embodiment, the time-frequency resource unit is equal to a symbol in time domain.

In one embodiment, a duration of the time-domain resource unit in the present disclosure is equal to a duration of the time-frequency resource unit in the present disclosure in time domain.

In one embodiment, a number of multicarrier symbols occupied by the time-frequency resource unit in the present disclosure in time domain is equal to a number of multicarrier symbols occupied by the time-domain resource unit in time domain.

In one embodiment, a number of subcarriers occupied by the frequency-domain resource unit in the present disclosure is equal to a number of subcarriers occupied by the time-frequency resource unit in the present disclosure in frequency domain.

Embodiment 13

Figure 13:
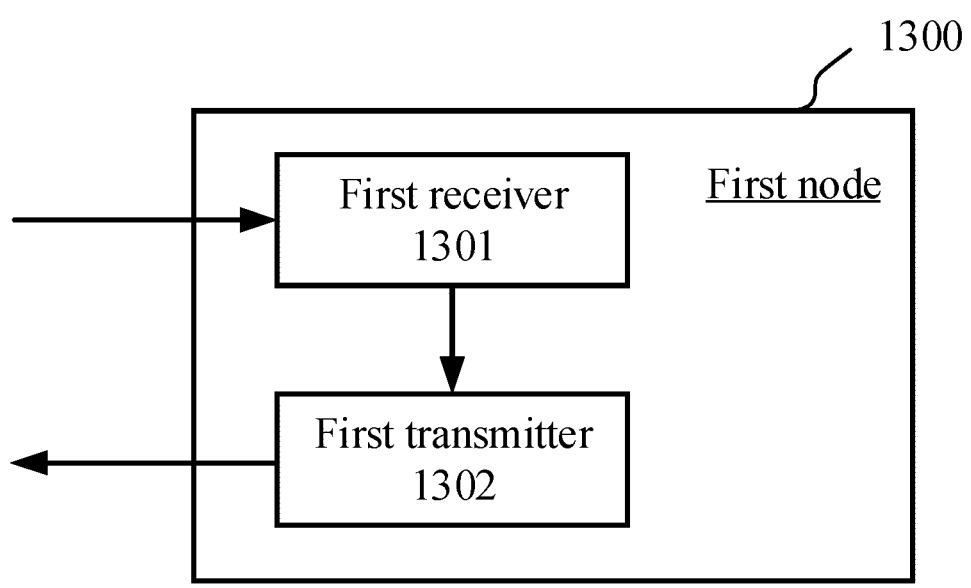
FIG. 13 illustrates a structure block diagram of a processing device in a first node according to one embodiment of the present disclosure.

Embodiment 13 illustrates a structure block diagram of a processing device in a first node, as shown in FIG. 13. In Embodiment 13, a first node's processing device 1300 is mainly composed of a first receiver 1301 and a first transmitter 1302.

In one embodiment, the first receiver 1301 comprises at least one of the antenna 452, the transmitter/receiver 454, the multi-antenna receiving processor 458, the receiving processor 456, the controller/processor 459, the memory 460 or the data source 467 in FIG. 4 of the present disclosure.

In one embodiment, the first transmitter 1302 comprises at least one of the antenna 452, the transmitter/receiver 454, the multi-antenna transmitting processor 457, the transmitting processor 468, the controller/processor 459, the memory 460 or the data source 467 in FIG. 4 of the present disclosure.

In Embodiment 13, the first receiver 1301 receives first information; the first transmitter 1302 transmits a first signaling in a first symbol group; the first transmitter 1302 transmits a first radio signal in a second symbol group; the first information indicates a first symbol set; the first symbol group belongs to the first symbol set; the first signaling indicates the second symbol group, the second symbol group comprising a positive integer number of multicarrier symbols; at least one multicarrier symbol of the positive integer number of multicarrier symbols comprised by the second symbol group belongs to the first symbol set, and at least one multicarrier symbol of the positive integer number of multicarrier symbols comprised by the second symbol group does not belong to the first symbol set; a first bit sequence is used for generating the first radio signal, and the first bit sequence comprises a first bit sub-sequence and a second bit sub-sequence, and an order of the first bit sub-sequence in the first bit sequence is prior to that of the second bit sub-sequence in the first bit sequence; the first bit sub-sequence is mapped onto multicarrier symbol(s) in the second symbol group belonging to the first symbol set, while the second bit sub-sequence is mapped onto multicarrier symbol(s) in the second symbol group not belonging to the first symbol set.

In one embodiment, the first receiver 1301 receives a second signaling, the second signaling indicating a second symbol set; the second symbol set comprises the first symbol set, and the second symbol group belongs to the second symbol set.

In one embodiment, the first receiver 1301 detects first target information in a third symbol group, and the first target information indicates whether the first radio signal is correctly decoded; the first symbol group is used for indicating the third symbol group; the third symbol group is unrelated to a number of and respective position(s) of multicarrier symbol(s) comprised by a second symbol sub-group; the second symbol sub-group comprises each multicarrier symbol in the second symbol group that does not belong to the first symbol set.

In one embodiment, the first receiver 1301 detects first target information in a third symbol group, and the first target information indicates whether the first radio signal is correctly decoded; a first symbol sub-group is used for indicating the third symbol group; the third symbol group is unrelated to a number of and respective position(s) of multicarrier symbol(s) comprised by a second symbol sub-group; the first symbol sub-group comprises each multicarrier symbol in the second symbol group that belongs to the first symbol set; the second symbol sub-group comprises each multicarrier symbol in the second symbol group that does not belong to the first symbol set.

In one embodiment, the first bit sub-sequence is sequentially mapped into multicarrier symbols comprised by the first symbol sub-group in chronological order; while the second bit sub-sequence is reversely mapped into multicarrier symbols comprised by the second symbol sub-group in chronological order.

In one embodiment, the first node's processing device 1300 is a UE.

In one embodiment, the first node's processing device 1300 is a relay node.

In one embodiment, the first node's processing device 1300 is a base station.

In one embodiment, the first node's processing device 1300 is vehicle-mounted communication equipment.

In one embodiment, the first node's processing device 1300 is a UE that supports V2X communications.

In one embodiment, the first node's processing device 1300 is a relay node that supports V2X communications.

Embodiment 14

Figure 14:
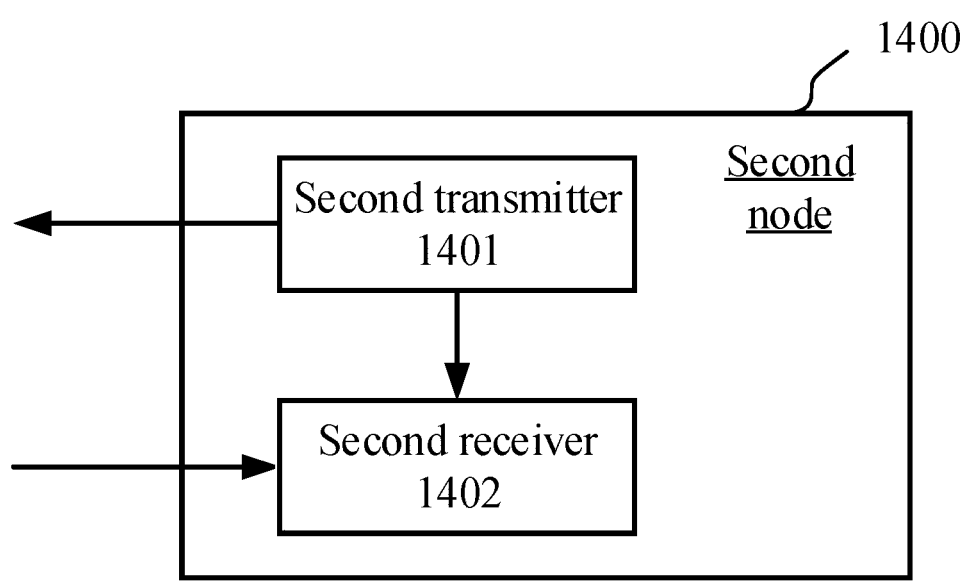
FIG. 14 illustrates a structure block diagram of a processing device in a second node according to one embodiment of the present disclosure.

Embodiment 14 illustrates a structure block diagram of a processing device in a second node, as shown in FIG. 14. In FIG. 14, a second node's processing device 1400 is mainly composed of a second transmitter 1401 and a second receiver 1402.

In one embodiment, the second transmitter 1401 comprises at least one of the antenna 420, the transmitter/receiver 418, the multi-antenna transmitting processor 471, the transmitting processor 416, the controller/processor 475 or a memory 476 in FIG. 4 of the present disclosure.

In one embodiment, the second receiver 1402 comprises the at least one of the antenna 420, the transmitter/receiver 418, the multi-antenna receiving processor 472, the receiving processor 470, the controller/processor 475 or the memory 476 in FIG. 4 of the present disclosure.

In Embodiment 14, the second transmitter 1401 transmits first information; the second receiver 1402 monitors a first signaling in a first symbol group; when the first signaling is detected, the second receiver 1402 receives a first radio signal in a second symbol group; the first information indicates a first symbol set; the first symbol group belongs to the first symbol set; the first signaling indicates the second symbol group, the second symbol group comprising a positive integer number of multicarrier symbols; at least one multicarrier symbol of the positive integer number of multicarrier symbols comprised by the second symbol group belongs to the first symbol set, and at least one multicarrier symbol of the positive integer number of multicarrier symbols comprised by the second symbol group does not belong to the first symbol set; a first bit sequence is used for generating the first radio signal, and the first bit sequence comprises a first bit sub-sequence and a second bit sub-sequence, and an order of the first bit sub-sequence in the first bit sequence is prior to that of the second bit sub-sequence in the first bit sequence; the first bit sub-sequence is mapped onto multicarrier symbol(s) in the second symbol group belonging to the first symbol set, while the second bit sub-sequence is mapped onto multicarrier symbol(s) in the second symbol group not belonging to the first symbol set.

In one embodiment, the second transmitter 1401 transmits a second signaling, the second signaling indicating a second symbol set; the second symbol set comprises the first symbol set, and the second symbol group belongs to the second symbol set.

In one embodiment, the second transmitter 1401 transmits first target information in a third symbol group, and the first target information indicates whether the first radio signal is correctly decoded; the first symbol group is used for indicating the third symbol group, and the third symbol group is unrelated to a number of and respective position(s) of multicarrier symbol(s) comprised by a second symbol sub-group; the second symbol sub-group comprises each multicarrier symbol in the second symbol group that does not belong to the first symbol set.

In one embodiment, the second transmitter 1401 transmits first target information in a third symbol group, and the first target information indicates whether the first radio signal is correctly decoded; a first symbol sub-group is used for indicating the third symbol group; the third symbol group is unrelated to a number of and respective position(s) of multicarrier symbol(s) comprised by a second symbol sub-group; the first symbol sub-group comprises each multicarrier symbol in the second symbol group that belongs to the first symbol set; the second symbol sub-group comprises each multicarrier symbol in the second symbol group that does not belong to the first symbol set.

In one embodiment, the first bit sub-sequence is sequentially mapped into multicarrier symbols comprised by the first symbol sub-group in chronological order; while the second bit sub-sequence is reversely mapped into multicarrier symbols comprised by the second symbol sub-group in chronological order.

In one embodiment, the second node's processing device 1400 is a UE.

In one embodiment, the second node's processing device 1400 is a base station.

In one embodiment, the second node's processing device 1400 is a relay node.

In one embodiment, the second node's processing device 1400 is a UE that supports V2X communications.

In one embodiment, the second node's processing device 1400 is a base station that supports V2X communications.

In one embodiment, the second node's processing device 1400 is a relay node that supports V2X communications.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first node includes but is not limited to mobile phones, tablet computers, notebooks, network cards, low-consumption equipment, enhanced MTC (eMTC) equipment, NB-IOT terminals, vehicle-mounted communication equipment, aircrafts, airplanes, unmanned aerial vehicles, telecontrolled aircrafts, etc. The second node in the present disclosure includes but is not limited to mobile phones, tablet computers, notebooks, network cards, low-consumption equipment, enhanced MTC (eMTC) equipment, NB-IOT terminals, vehicle-mounted communication equipment, aircrafts, airplanes, unmanned aerial vehicles, telecontrolled aircrafts, etc. The UE or terminal in the present disclosure includes but is not limited to mobile phones, tablet computers, notebooks, network cards, low-consumption equipment, enhanced MTC (eMTC) equipment, NB-IOT terminals, vehicle-mounted communication equipment, aircrafts, airplanes, unmanned aerial vehicles, telecontrolled aircrafts, etc. The base station or network side equipment includes but is not limited to macro-cellular base stations, micro-cellular base stations, home base stations, relay base station, eNB, gNB, Transmitter Receiver Point (TRP), GNSS, relay satellites, satellite base station, airborne base station and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node used for wireless communications, comprising:
   a first receiver, which receives first information, the first information indicating a first symbol set, the first information comprises one or more fields in a Radio Resource Control (RRC) Information Element (IE), the first symbol set comprises a plurality of multicarrier symbols, the plurality of multicarrier symbols comprised by the first symbol set is used for transmitting Sidelink Control Information (SCI); and
   a first transmitter, which transmits a first signaling in a first symbol group, the first signaling is SCI, the first symbol group comprises a Physical Sidelink Control Channel (PSCCH);
   the first transmitter, which also transmits a first radio signal in a second symbol group, the first radio signal is transmitted through a Physical Sidelink Shared Channel (PSSCH), the second symbol group comprises a PSSCH;
   wherein the first symbol group belongs to the first symbol set; the first signaling indicates the second symbol group, the second symbol group comprising a plurality of multicarrier symbols; at least one multicarrier symbol of the plurality of multicarrier symbols comprised by the second symbol group belongs to the first symbol set and is used for transmitting SCI, and at least one multicarrier symbol of the plurality of multicarrier symbols comprised by the second symbol group does not belong to the first symbol set and is used for transmitting a Sidelink Shared Channel (SL-SCH); a first bit sequence is used for generating the first radio signal, and the first bit sequence comprises a first bit sub-sequence and a second bit sub-sequence, and an order of the first bit sub-sequence in the first bit sequence is prior to that of the second bit sub-sequence in the first bit sequence; the first bit sub-sequence is mapped onto one or more multicarrier symbols in the second symbol group belonging to the first symbol set, while the second bit sub-sequence is mapped onto one or more multicarrier symbols in the second symbol group; the first bit sequence comprises one or more fields in a piece of SCI and a Transport Block (TB).

2. The first node according to claim 1, wherein the second symbol group belongs to a second symbol set; the second symbol set comprises the first symbol set, the second symbol set comprises a plurality of multicarrier symbols, at least one of the plurality of multicarrier symbols comprised by the second symbol set does not belong to the first symbol set, and each of the plurality of multicarrier symbols comprised by the second symbol set is an Uplink (UL) symbol.

3. The first node according to claim 1, wherein the second symbol set is obtained by the first node through Resource Selection or the first node according to claim 1, comprising:
   the first receiver receiving a second signaling, wherein the second signaling indicates the second symbol set, the second signaling comprises one or more fields in a Medium Access Control (MAC) Control Element (CE), and the second signaling is transmitted through a PSSCH.

4. The first node according to claim 3, comprising:
   the first receiver detecting first target information in a third symbol group, the first target information comprises either HARQ-ACK or HARQ-NACK, the first target information comprises a second sequence, the third symbol group comprises a Physical Sidelink Feedback Channel (PSFCH);
   wherein the first target information indicates whether the first radio signal is correctly decoded; the first symbol group is used for determining the third symbol group.

5. The first node according to claim 4, wherein the second symbol group comprises a first symbol sub-group and a second symbol sub-group, the first symbol sub-group comprises each multicarrier symbol in the second symbol group that belongs to the first symbol set; the second symbol sub-group comprises each multicarrier symbol in the second symbol group that does not belong to the first symbol set; the first bit sub-sequence is sequentially mapped into multicarrier symbols comprised by the first symbol sub-group in chronological order.

6. A second node used for wireless communications, comprising:
- a second receiver, which receives first information, the first information indicating a first symbol set, the first information comprises one or more fields in a Radio Resource Control (RRC) Information Element (IE), the first symbol set comprises a plurality of multicarrier symbols, the plurality of multicarrier symbols comprised by the first symbol set is used for transmitting Sidelink Control Information (SCI); and
- the second receiver, which monitors a first signaling in a first symbol group, the first signaling is SCI, the first symbol group comprises a Physical Sidelink Control Channel (PSCCH);
- the second receiver, which receives a first radio signal in a second symbol group when the first signaling is detected, the first radio signal is transmitted through a Physical Sidelink Shared Channel (PSSCH), the second symbol group comprises a PSSCH;
- wherein the first symbol group belongs to the first symbol set; the first signaling indicates the second symbol group, the second symbol group comprising a plurality of multicarrier symbols; at least one multicarrier symbol of the plurality of multicarrier symbols comprised by the second symbol group belongs to the first symbol set and is used for transmitting SCI, and at least one multicarrier symbol of the plurality of multicarrier symbols comprised by the second symbol group does not belong to the first symbol set and is used for transmitting a Sidelink Shared Channel (SL-SCH); a first bit sequence is used for generating the first radio signal, and the first bit sequence comprises a first bit sub-sequence and a second bit sub-sequence, and an order of the first bit sub-sequence in the first bit sequence is prior to that of the second bit sub-sequence in the first bit sequence; the first bit sub-sequence is mapped onto one or more multicarrier symbols in the second symbol group belonging to the first symbol set, while the second bit sub-sequence is mapped onto one or more multicarrier symbols in the second symbol group; the first bit sequence comprises one or more fields in a piece of SCI and a Transport Block (TB).

7. The first node according to claim 6, wherein the second symbol group belongs to a second symbol set; the second symbol set comprises the first symbol set, the second symbol set comprises a plurality of multicarrier symbols, at least one of the plurality of multicarrier symbols comprised by the second symbol set does not belong to the first symbol set, and each of the plurality of multicarrier symbols comprised by the second symbol set is an Uplink (UL) symbol.

8. The second node according to claim 7, wherein the second transmitter transmits a second signaling; wherein the second signaling indicates a second symbol set, the second signaling comprises one or more fields in a Medium Access Control (MAC) Control Element (CE), and the second signaling is transmitted through a PSSCH.

9. The second node according to claim 8, comprising:
- the second transmitter transmitting a first target information in a third symbol group, the first target information comprises either HARQ-ACK or HARQ-NACK, the first target information comprises a second sequence, the third symbol group comprises a Physical Sidelink Feedback Channel (PSFCH); wherein the first target information indicates whether the first radio signal is correctly decoded, a first symbol group is used for determining the third symbol group; or,
- when the first bit sequence is correctly decoded, the second transmitter drops a transmission of a first target signal; when the first bit sequence is not correctly decoded, the second transmitter transmitting a first target information in a third symbol group; wherein the first target information indicates the first radio signal is not correctly decoded, the first target information comprises HARQ-NACK, the first target information comprises a second sequence, the third symbol group comprises a PSFCH.

10. The second node according to claim 9, wherein the second symbol group comprises a first symbol sub-group and a second symbol sub-group, the first symbol sub-group comprises each multicarrier symbol in the second symbol group that belongs to the first symbol set; the second symbol sub-group comprises each multicarrier symbol in the second symbol group that does not belong to the first symbol set; the first bit sub-sequence is sequentially mapped into multicarrier symbols comprised by the first symbol sub-group in chronological order.

11. A method in a first node used for wireless communications, comprising:
- receiving first information, the first information indicating a first symbol set, the first information comprises one or more fields in a Radio Resource Control (RRC) Information Element (IE), the first symbol set comprises a plurality of multicarrier symbols, the plurality of multicarrier symbols comprised by the first symbol set is used for transmitting Sidelink Control Information (SCI);
- transmitting a first signaling in a first symbol group, the first signaling is SCI, the first symbol group comprises a Physical Sidelink Control Channel (PSCCH); and
- transmitting a first radio signal in a second symbol group, the first radio signal is transmitted through a Physical Sidelink Shared Channel (PSSCH), the second symbol group comprises a PSSCH;
- wherein the first symbol group belongs to the first symbol set; the first signaling indicates the second symbol group, the second symbol group comprising a plurality of multicarrier symbols; at least one multicarrier symbol of the plurality of multicarrier symbols comprised by the second symbol group belongs to the first symbol set and is used for transmitting SCI, and at least one multicarrier symbol of the plurality of multicarrier symbols comprised by the second symbol group does not belong to the first symbol set and is used for transmitting a Sidelink Shared Channel (SL-SCH); a first bit sequence is used for generating the first radio signal, and the first bit sequence comprises a first bit sub-sequence and a second bit sub-sequence, and an order of the first bit sub-sequence in the first bit sequence is prior to that of the second bit sub-sequence in the first bit sequence; the first bit sub-sequence is mapped onto one or more multicarrier symbols in the second symbol group belonging to the first symbol set, while the second bit sub-sequence is mapped onto one or more multicarrier symbols in the second symbol group; the first bit sequence comprises one or more fields in a piece of SCI and a Transport Block (TB).

12. The first node according to claim 11, wherein the second symbol group belongs to a second symbol set; the second symbol set comprises the first symbol set, the second symbol set comprises a plurality of multicarrier symbols, at least one of the plurality of multicarrier symbols comprised by the second symbol set does not belong to the first symbol set, and each of the plurality of multicarrier symbols comprised by the second symbol set is an Uplink (UL) symbol.

13. The method according to claim 12, wherein the second symbol set is obtained by the first node through Resource Selection or the first node according to claim 12, comprising:
receiving a second signaling, wherein the second signaling indicates a second symbol set, the second signaling comprises one or more fields in a Medium Access Control (MAC) Control Element (CE), and the second signaling is transmitted through a PSSCH.

14. The method according to claim 13, comprising:
detecting first target information in a third symbol group, the first target information comprises either HARQ-ACK or HARQ-NACK, the first target information comprises a second sequence, the third symbol group comprises a Physical Sidelink Feedback Channel (PSFCH);
wherein the first target information indicates whether the first radio signal is correctly decoded; the first symbol group is used for determining the third symbol group.

15. The method according to claim 14, wherein the second symbol group comprises a first symbol sub-group and a second symbol sub-group, the first symbol sub-group comprises each multicarrier symbol in the second symbol group that belongs to the first symbol set; the second symbol sub-group comprises each multicarrier symbol in the second symbol group that does not belong to the first symbol set; the first bit sub-sequence is sequentially mapped into multicarrier symbols comprised by the first symbol sub-group in chronological order.

16. A method in a second node used for wireless communications, comprising:
receiving first information, the first information indicating a first symbol set, the first information comprises one or more fields in a Radio Resource Control (RRC) Information Element (IE), the first symbol set comprises a plurality of multicarrier symbols, the plurality of multicarrier symbols comprised by the first symbol set is used for transmitting Sidelink Control Information (SCI);
monitoring a first signaling in a first symbol group, the first signaling is SCI, the first symbol group comprises a Physical Sidelink Control Channel (PSCCH); and
receiving a first radio signal in a second symbol group when the first signaling is detected, the first radio signal is transmitted through a Physical Sidelink Shared Channel (PSSCH), the second symbol group comprises a PSSCH;
wherein the first symbol group belongs to the first symbol set; the first signaling indicates the second symbol group, the second symbol group comprising a plurality of multicarrier symbols; at least one multicarrier symbol of the plurality of multicarrier symbols comprised by the second symbol group belongs to the first symbol set and is used for transmitting SCI, and at least one multicarrier symbol of the plurality of multicarrier symbols comprised by the second symbol group does not belong to the first symbol set and is used for transmitting a Sidelink Shared Channel (SL-SCH); a first bit sequence is used for generating the first radio signal, and the first bit sequence comprises a first bit sub-sequence and a second bit sub-sequence, and an order of the first bit sub-sequence in the first bit sequence is prior to that of the second bit sub-sequence in the first bit sequence; the first bit sub-sequence is mapped onto one or more multicarrier symbols in the second symbol group belonging to the first symbol set, while the second bit sub-sequence is mapped onto one or more multicarrier symbols in the second symbol group; the first bit sequence comprises one or more fields in a piece of SCI and a Transport Block (TB).

17. The first node according to claim 16, wherein the second symbol group belongs to a second symbol set; the second symbol set comprises the first symbol set, the second symbol set comprises a plurality of multicarrier symbols, at least one of the plurality of multicarrier symbols comprised by the second symbol set does not belong to the first symbol set, and each of the plurality of multicarrier symbols comprised by the second symbol set is an Uplink (UL) symbol.

18. The method according to claim 17, transmitting a second signaling; wherein the second signaling indicates a second symbol set, the second signaling comprises one or more fields in a Medium Access Control (MAC) Control Element (CE), and the second signaling is transmitted through a PSSCH.

19. The method according to claim 16, comprising:
transmitting a first target information in a third symbol group, the first target information comprises either HARQ-ACK or HARQ-NACK, the first target information comprises a second sequence, the third symbol group comprises a Physical Sidelink Feedback Channel (PSFCH); wherein the first target information indicates whether the first radio signal is correctly decoded, a first symbol group is used for determining the third symbol group; or,
when the first bit sequence is correctly decoded, the second transmitter drops a transmission of a first target signal; when the first bit sequence is not correctly decoded, the second transmitter transmitting a first target information in a third symbol group; wherein the first target information indicates the first radio signal is not correctly decoded, the first target information comprises HARQ-NACK, the first target information comprises a second sequence, the third symbol group comprises a PSFCH.

20. The method according to claim 16, wherein the second symbol group comprises a first symbol sub-group and a second symbol sub-group, the first symbol sub-group comprises each multicarrier symbol in the second symbol group that belongs to the first symbol set; the second symbol sub-group comprises each multicarrier symbol in the second symbol group that does not belong to the first symbol set; the first bit sub-sequence is sequentially mapped into multicarrier symbols comprised by the first symbol sub-group in chronological order.

\* \* \* \* \*